United States Patent
Komiyama

(10) Patent No.: US 11,789,247 B2
(45) Date of Patent: Oct. 17, 2023

(54) ZOOM LENS AND IMAGE PICKUP APPARATUS

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 17/306,982

(22) Filed: May 4, 2021

(65) Prior Publication Data
US 2021/0356721 A1    Nov. 18, 2021

(30) Foreign Application Priority Data

May 14, 2020   (JP) ................................ 2020-084955

(51) Int. Cl.
*G02B 15/14*   (2006.01)

(52) U.S. Cl.
CPC ............... *G02B 15/144511* (2019.08); *G02B 15/145511* (2019.08); *G02B 15/145527* (2019.08)

(58) Field of Classification Search
CPC .... G02B 15/144511; G02B 15/145511; G02B 15/145527
See application file for complete search history.

(56) References Cited

U.S. PATENT DOCUMENTS

| | | | |
|---|---|---|---|
| 2013/0215320 A1* | 8/2013 | Souma | G02B 15/144511 359/686 |
| 2019/0056572 A1* | 2/2019 | Takada | G02B 27/0062 |

FOREIGN PATENT DOCUMENTS

| | | |
|---|---|---|
| CN | 105652423 A | 6/2016 |
| CN | 106468826 A | 3/2017 |
| CN | 109975966 A | 7/2019 |
| JP | 2012-226307 A | 11/2012 |
| JP | 2013-171165 A | 9/2013 |
| WO | 2017/175306 A1 | 10/2017 |

OTHER PUBLICATIONS

Chinese Office Action issued in corresponding CN Patent Application No. 202110523450.9, dated Mar. 8, 2023, with English translation.

* cited by examiner

*Primary Examiner* — George G. King
(74) *Attorney, Agent, or Firm* — Carter, DeLuca & Farrell LLP

(57) ABSTRACT

A zoom lens includes, in order from an object side to an image side, a first lens unit having a negative refractive power, a second lens unit having a positive refractive power, a third lens unit having a negative refractive power, and a fourth lens unit having a positive refractive power. The first lens unit includes a negative lens B1Ln with a concave surface facing the object side. The second lens unit includes at least one negative lens. During zooming from a wide-angle end to a telephoto end, the first lens unit moves, and the fourth lens unit is fixed or moves from the object side to the image side. A predetermined condition is satisfied.

15 Claims, 19 Drawing Sheets

ZOOM LENS AND IMAGE PICKUP APPARATUS

BACKGROUND OF THE INVENTION

Field of the Invention

The present invention relates to a zoom lens and an image pickup apparatus.

Description of the Related Art

Optical systems used for the image pickup apparatus have recently required to achieve a wide angle and a high performance, and a small size. In order to achieve the wide-angle and high-performance optical system, an optical system having a so-called retrofocus configuration having a first lens unit having a negative refractive power and a second lens unit having a positive refractive power has frequently been used. For the miniaturization, a so-called retractable optical system is known. Japanese Patent Laid-Open Nos. (JPs) 2012-226307 and 2013-171165 disclose zoom lenses including lens units having negative, positive, negative, and positive refractive powers.

However, it is difficult for the zoom lens disclosed in JP 2012-226307 to be compact while correcting the distortion that is a problem in the wide-angle lens. In the zoom lens disclosed in JP 2013-171165, each lens unit is thick on the optical axis, and compactness is difficult even with a retractable structure. In addition, the aberration significantly fluctuates during zooming.

SUMMARY OF THE INVENTION

The present invention provides a wide-angle, high-performance, and compact zoom lens, and image pickup apparatus having the same.

A zoom lens according to one aspect of the present invention includes, inorder from an object side to an image side, a first lens unit having a negative refractive power, a second lens unit having a positive refractive power, a third lens unit having a negative refractive power, and a fourth lens unit having a positive refractive power. The first lens unit includes a negative lens B1Ln with a concave surface facing the object side. The second lens unit includes at least one negative lens. During zooming from a wide-angle end to a telephoto end, the first lens unit moves, and the fourth lens unit is fixed or moves from the object side to the image side. The following conditional expressions are satisfied:

$$-1.50 < f1/D1 < -0.20$$

$$1.870 < nLnave < 2.500$$

where f1 is a focal length of the first lens unit, D1 is a distance on an optical axis from a surface closest to an object to a surface closest to an image plane of the first lens unit, and nLnave is an average refractive index of all negative lenses included in the second lens unit.

An image pickup apparatus having the above zoom lens also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
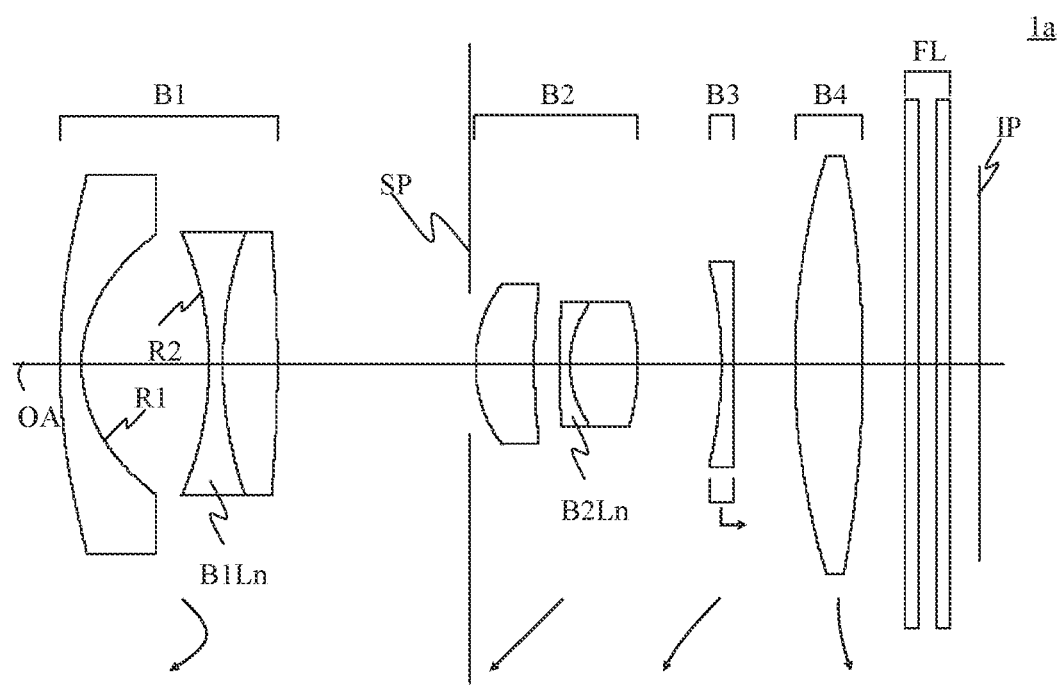
FIG. 1 is a sectional view of a zoom lens in an in-focus state at infinity according to Example 1.
Figure 2A:
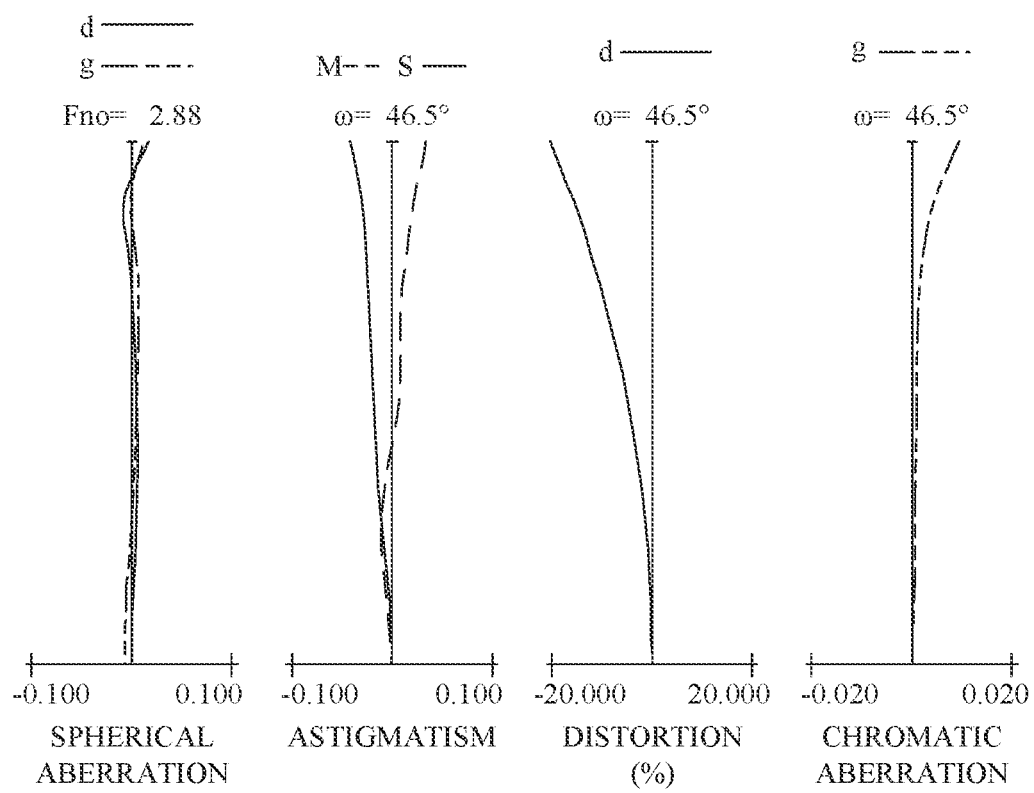
FIGS. 2A to 2C are longitudinal aberration diagrams of the zoom lens at a wide-angle end, a middle zoom position, and a telephoto end in the in-focus state at infinity according to Example 1.
Figure 2B:
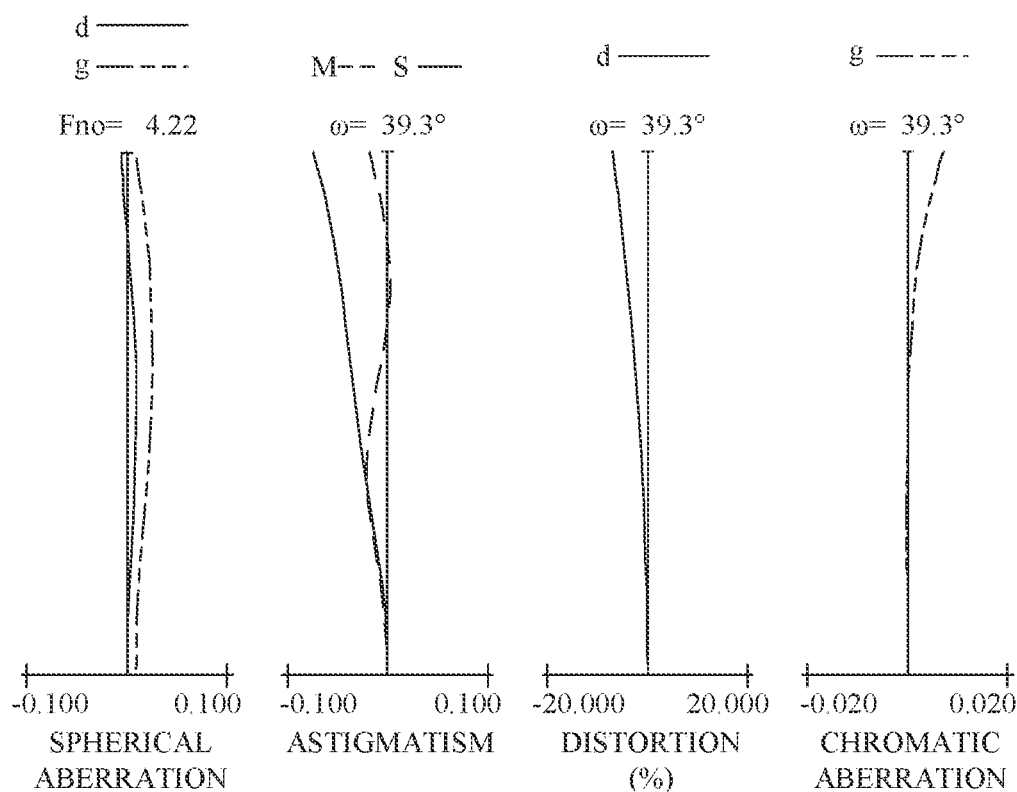
Figure 2C:
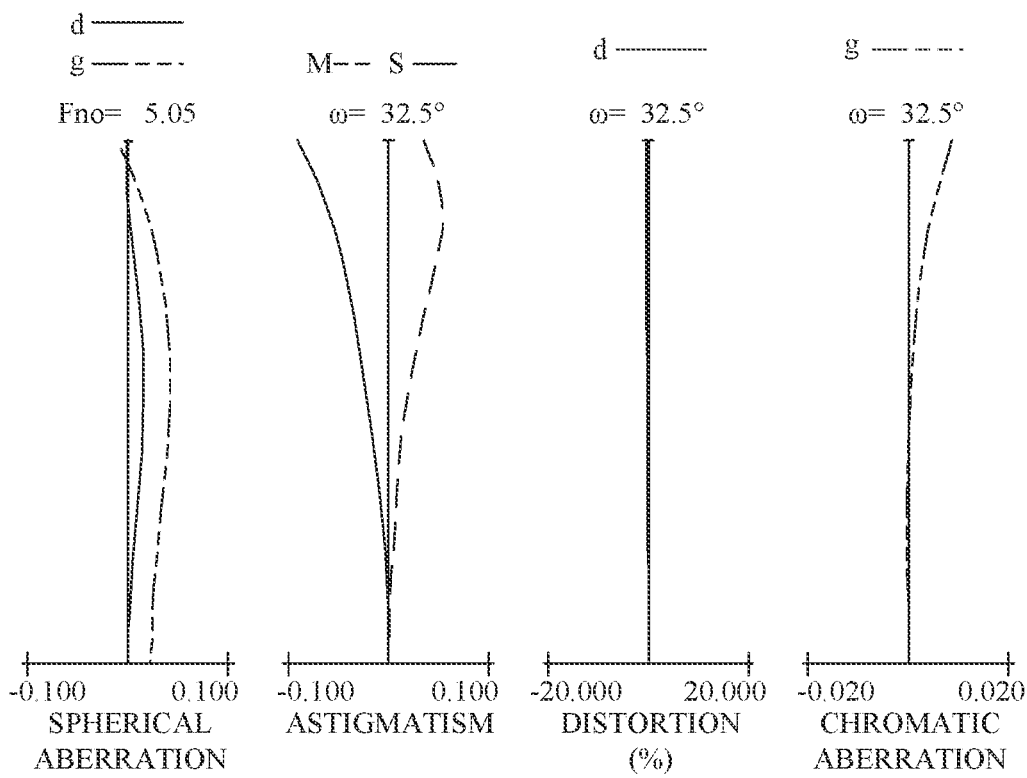

FIG. 1 is a sectional view of a zoom lens 1a at a wide-angle end in an in-focus state at infinity according to Example 1. FIGS. 2A to 2C are longitudinal aberration diagrams of the zoom lens 1a at the wide-angle end, a middle zoom position, and a telephoto end, respectively.

Figure 3:
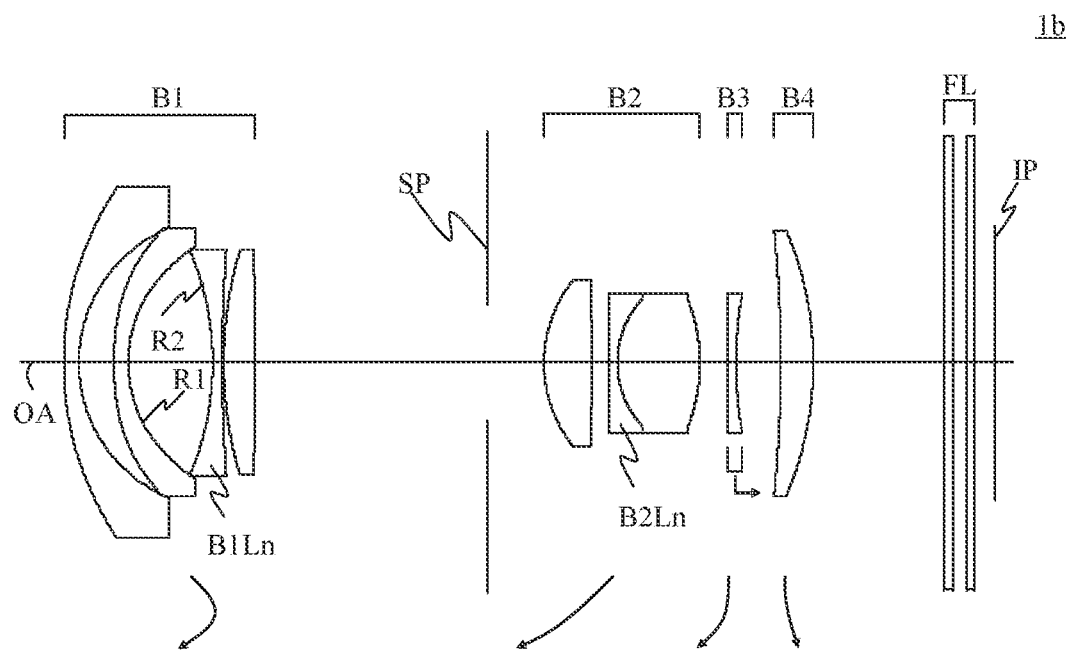
FIG. 3 is a sectional view of a zoom lens in an in-focus state at infinity according to Example 2.
Figure 4A:
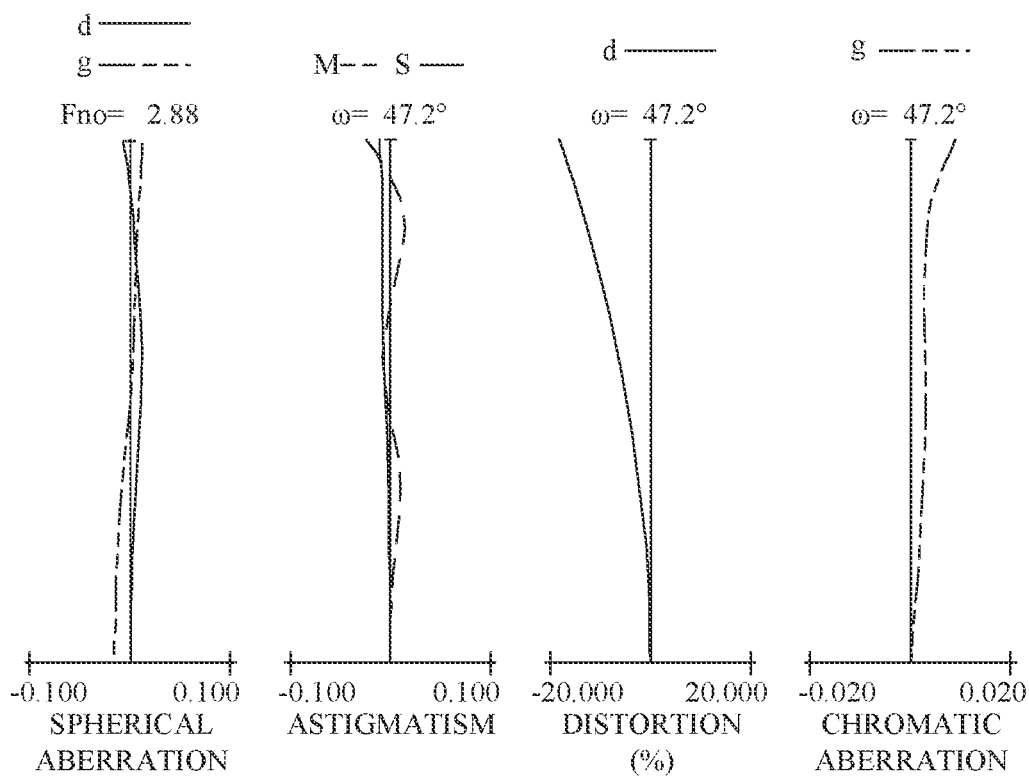
FIGS. 4A to 4C are longitudinal aberration diagrams of the zoom lens at a wide-angle end, a middle zoom position, and a telephoto end in the in-focus state at infinity according to Example 2.
Figure 4B:
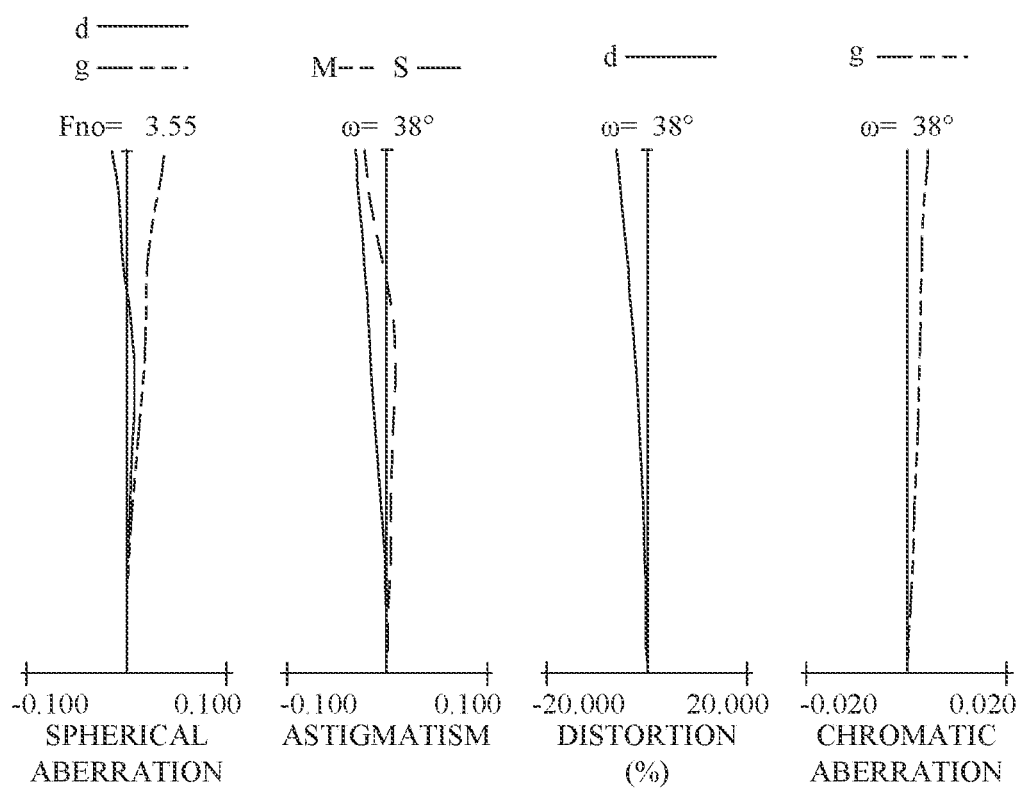
Figure 4C:
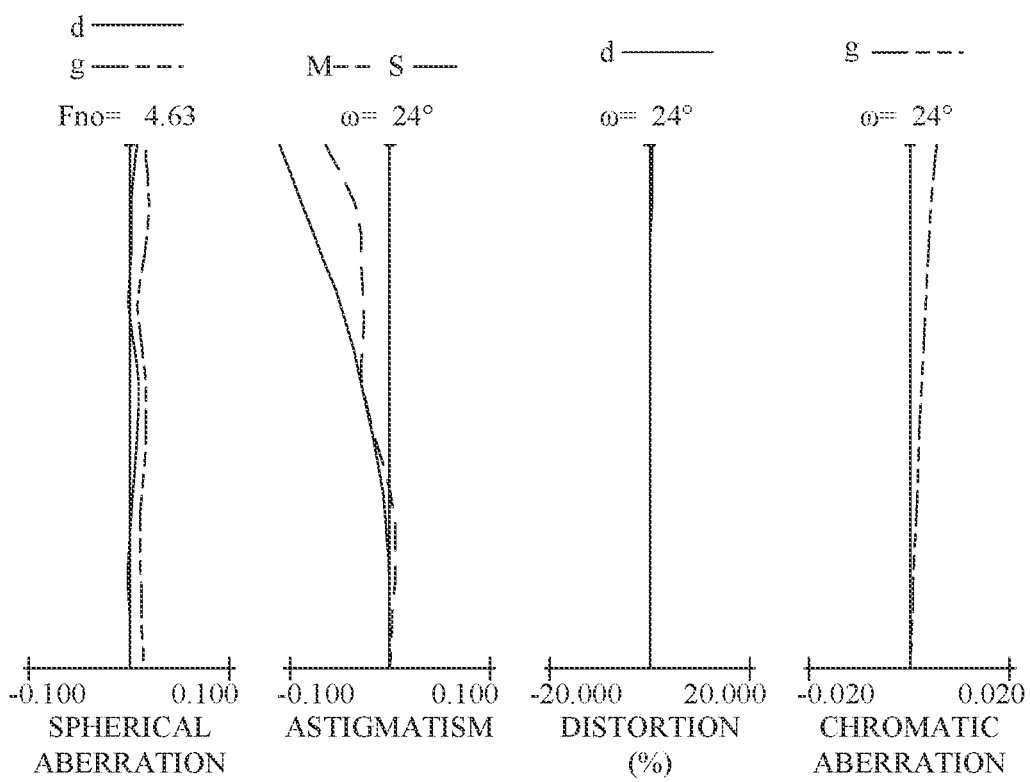
Figure 5:
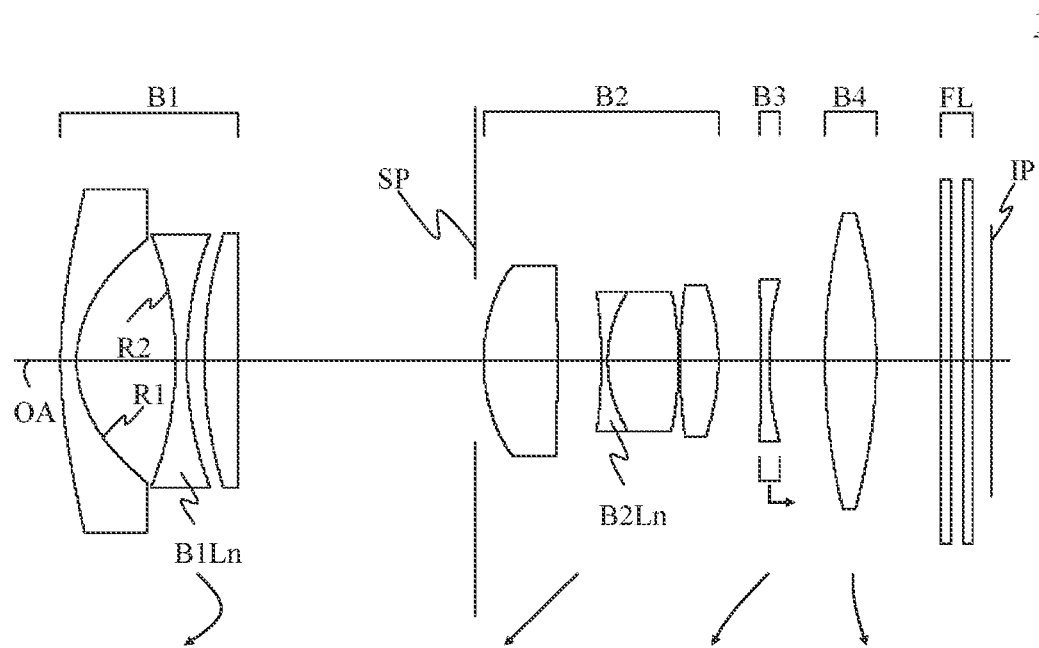
FIG. 5 is a sectional view of a zoom lens in an in-focus state at infinity according to Example 3.
Figure 6A:
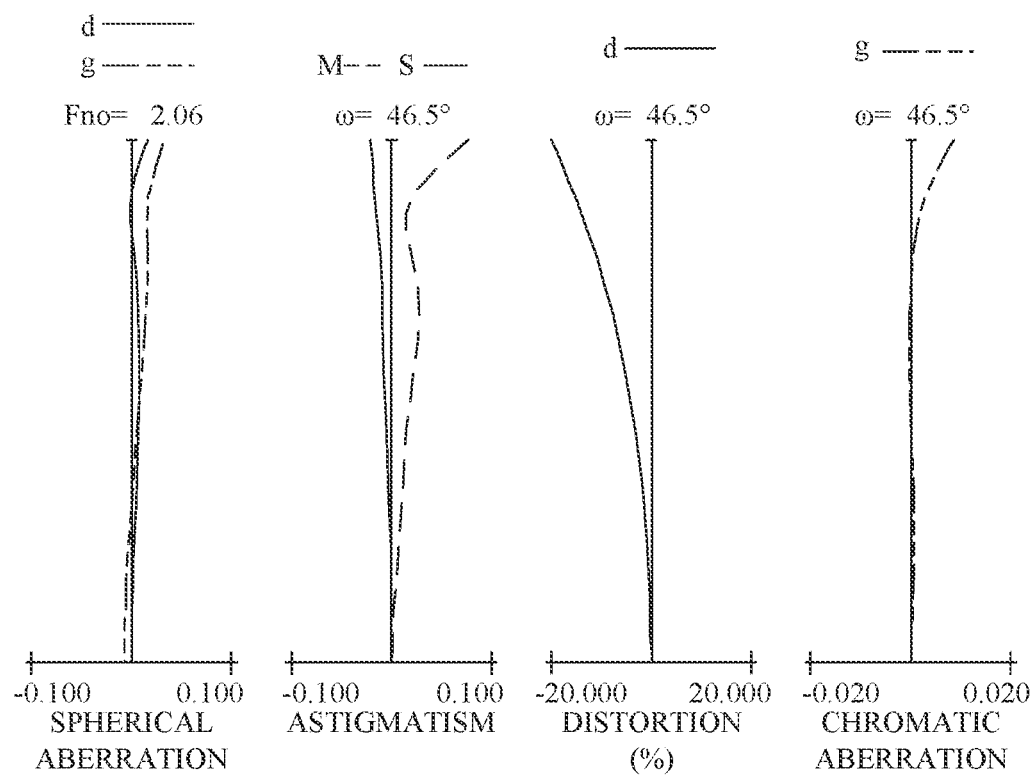
FIGS. 6A to 6C are longitudinal aberration diagrams of the zoom lens at a wide-angle end, a middle zoom position, and a telephoto end in the in-focus state at infinity according to Example 3.
Figure 6B:
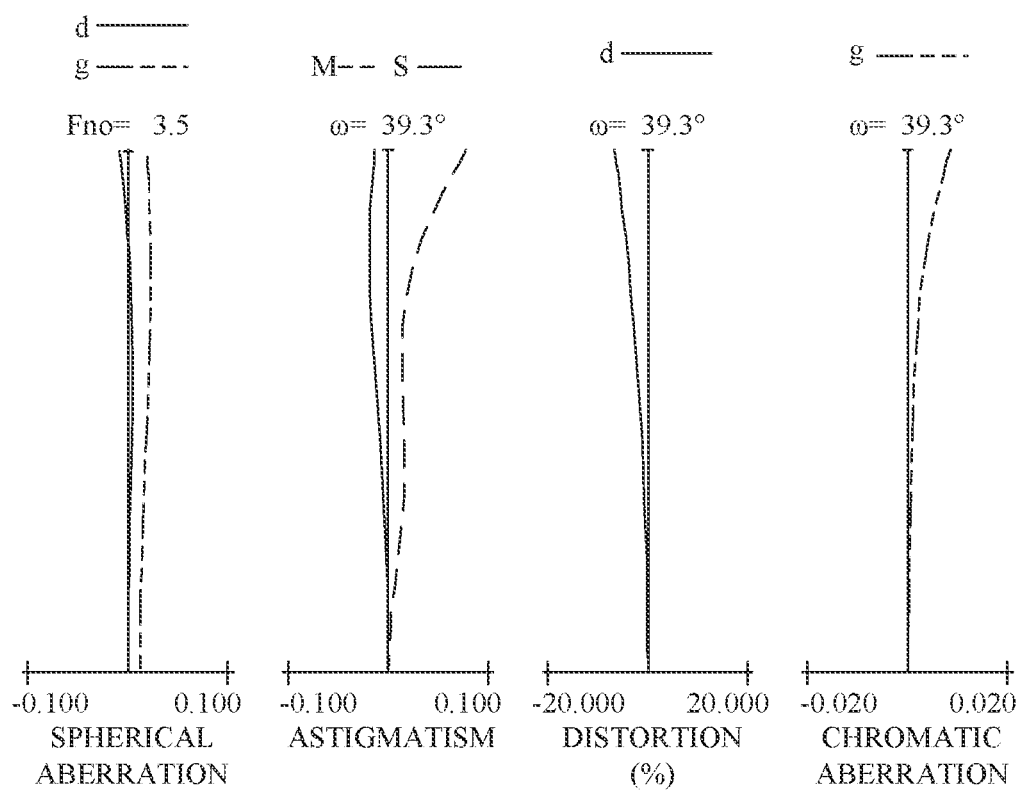
Figure 6C:
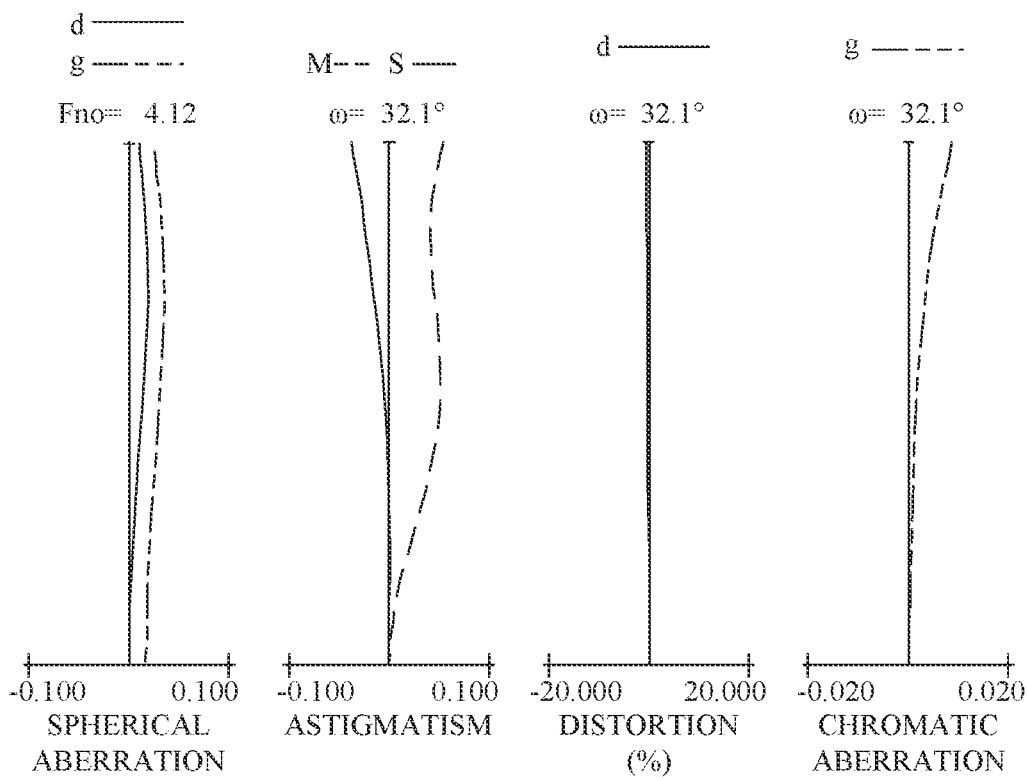
Figure 7:
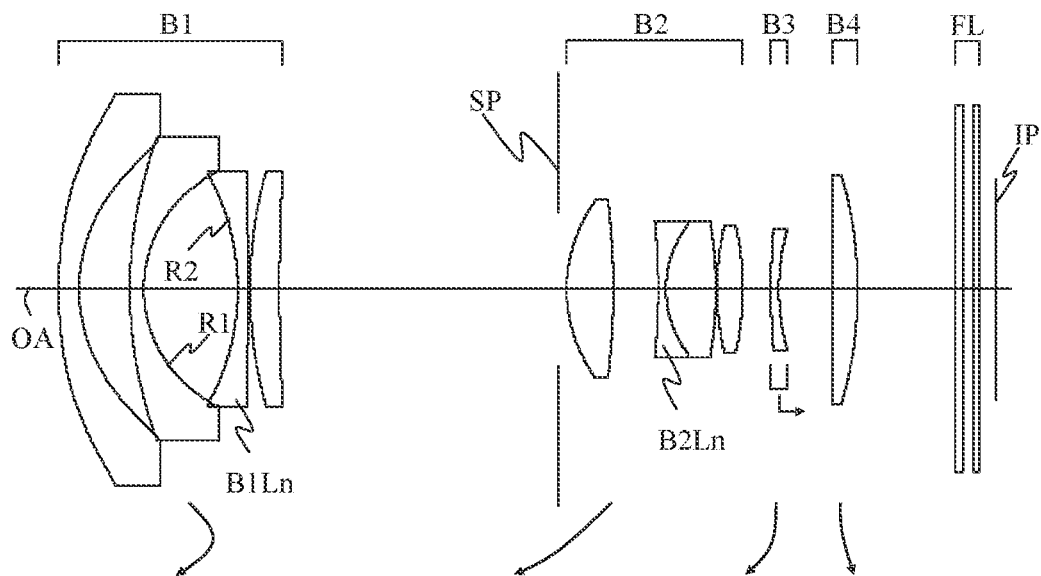
FIG. 7 is a sectional view of a zoom lens in an in-focus state at infinity according to Example 4.
Figure 8A:
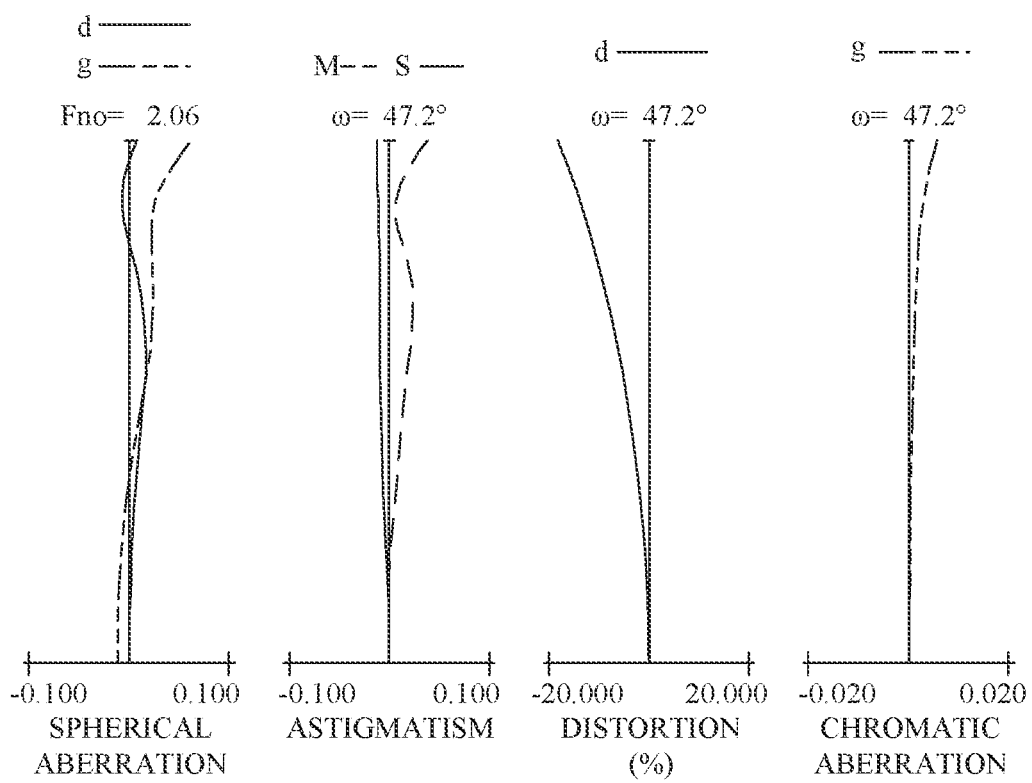
FIGS. 8A to 8C are longitudinal aberration diagrams of the zoom lens at a wide-angle end, a middle zoom position, and a telephoto end in the in-focus state at infinity according to Example 4.
Figure 8B:
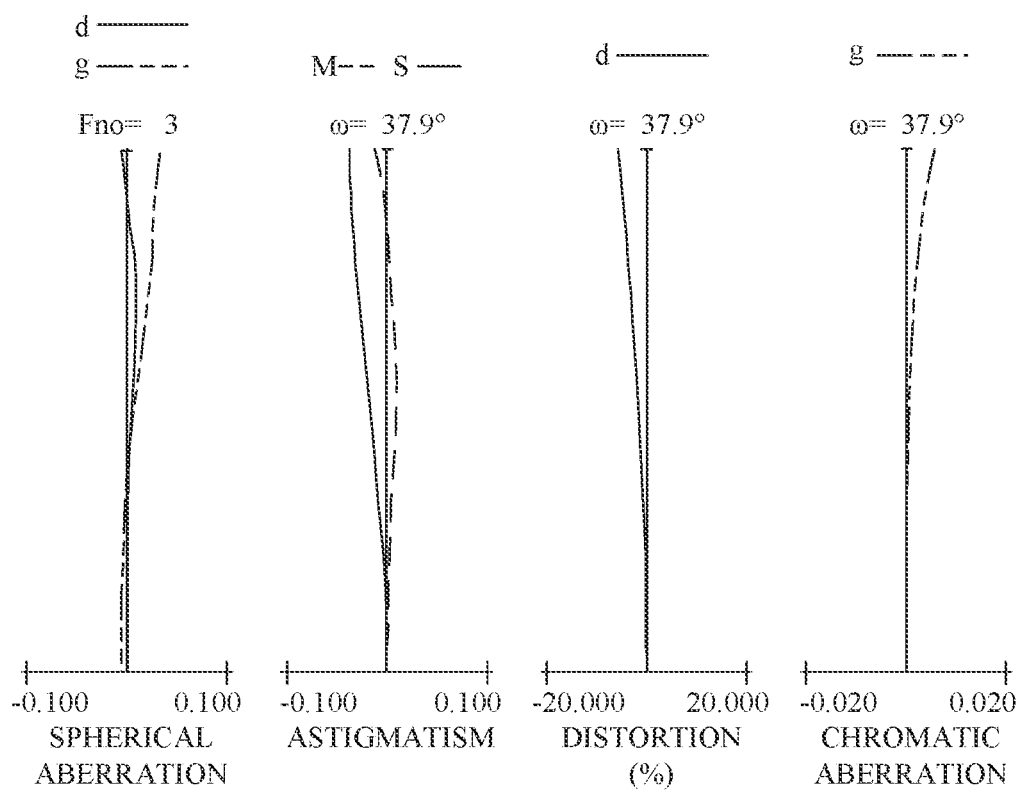
Figure 8C:
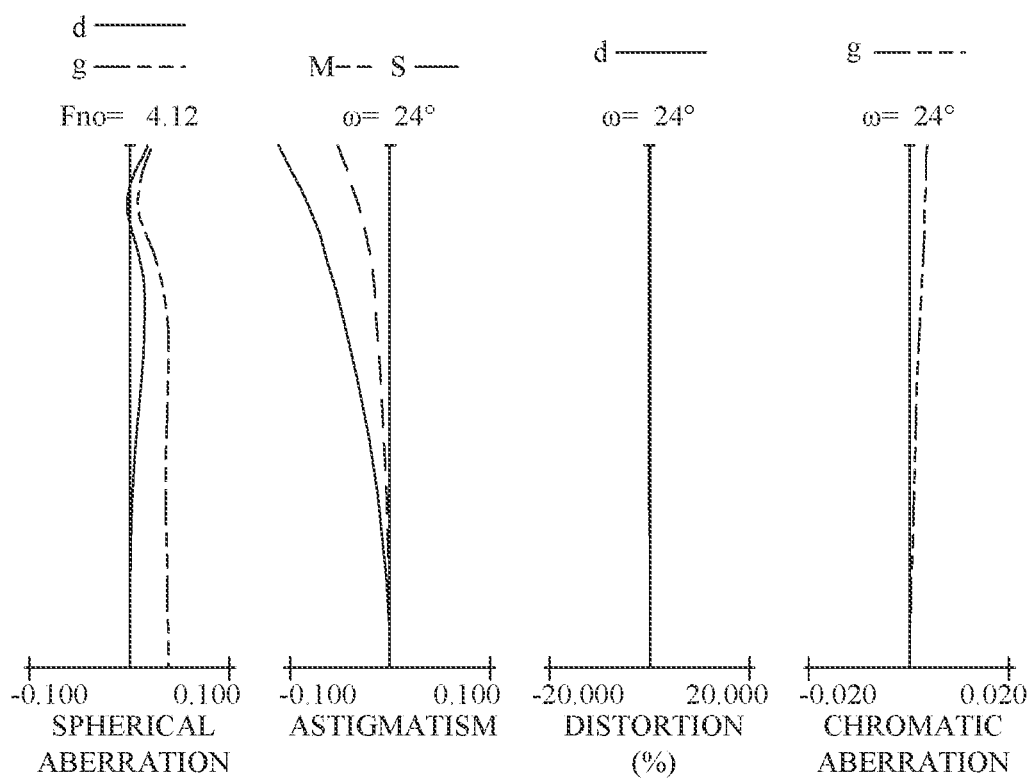
Figure 9:
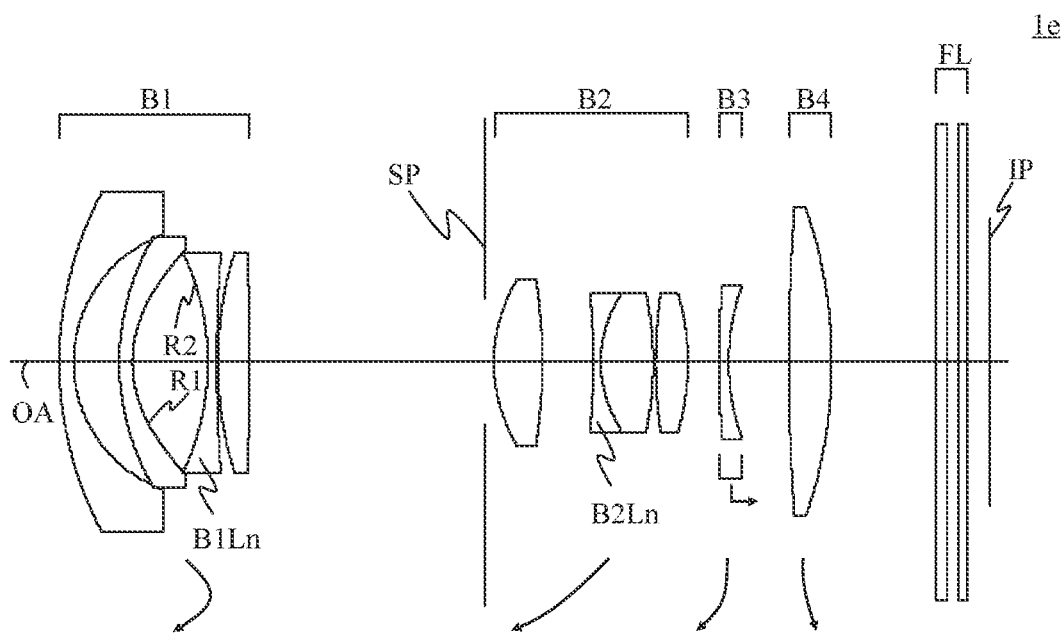
FIG. 9 is a sectional view of a zoom lens in an in-focus state at infinity according to Example 5.
Figure 10A:
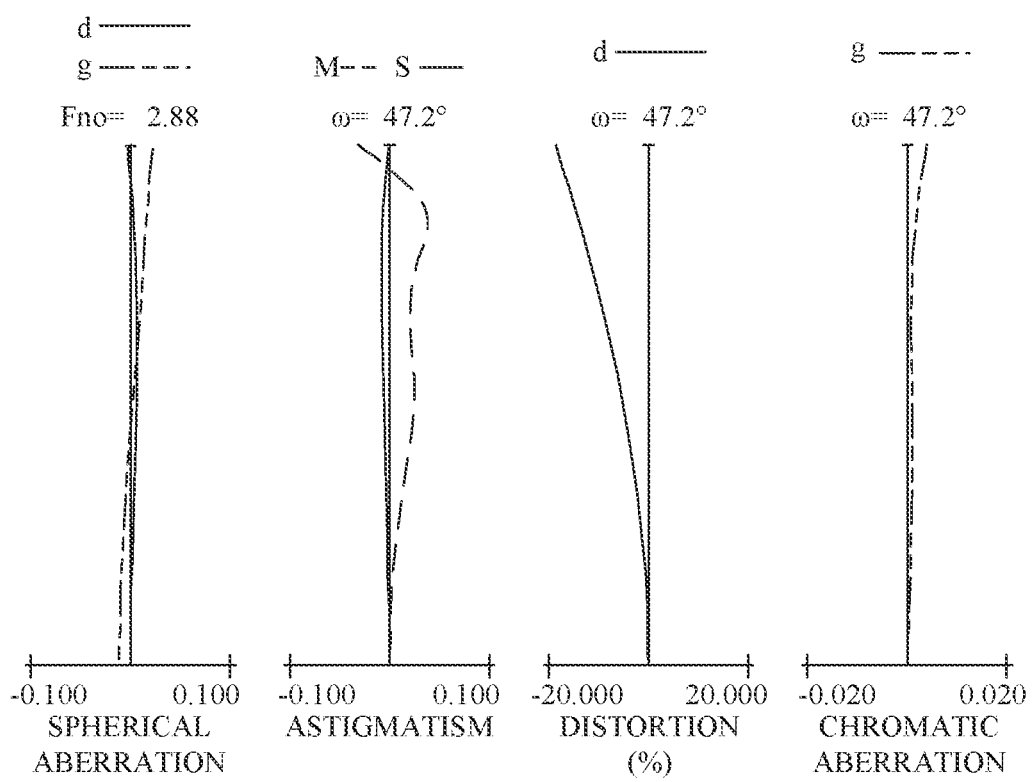
FIGS. 10A to 10C are longitudinal aberration diagrams of the zoom lens at a wide-angle end, a middle zoom position, and a telephoto end in the in-focus state at infinity according to Example 5.
Figure 10B:
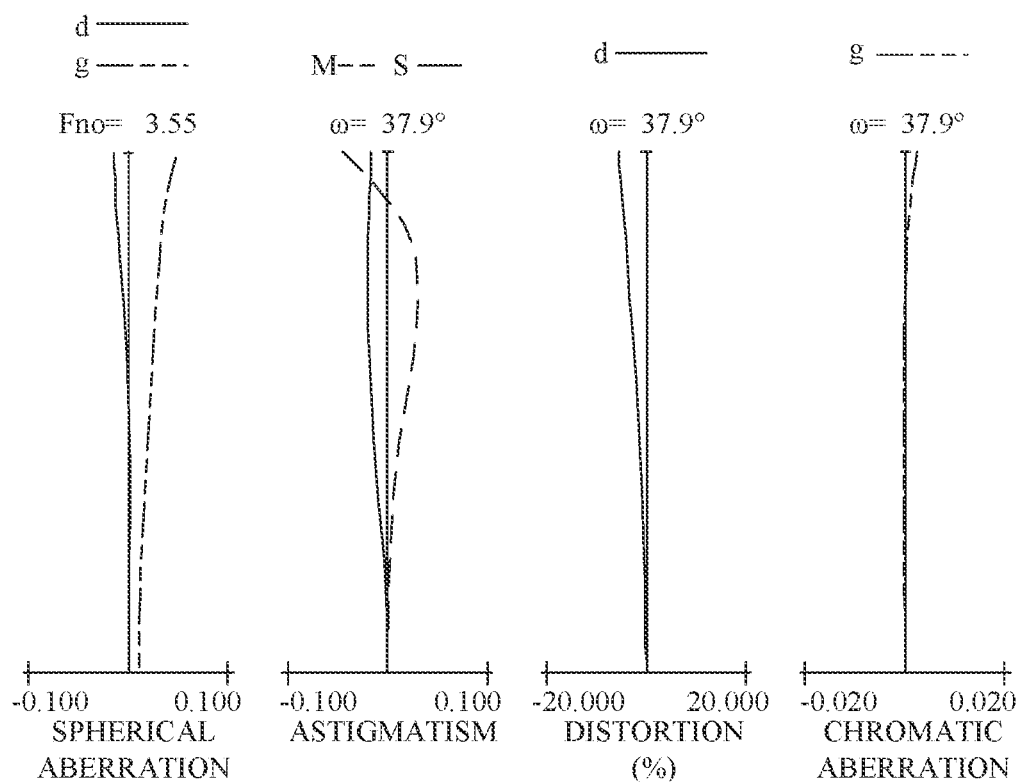
Figure 10C:
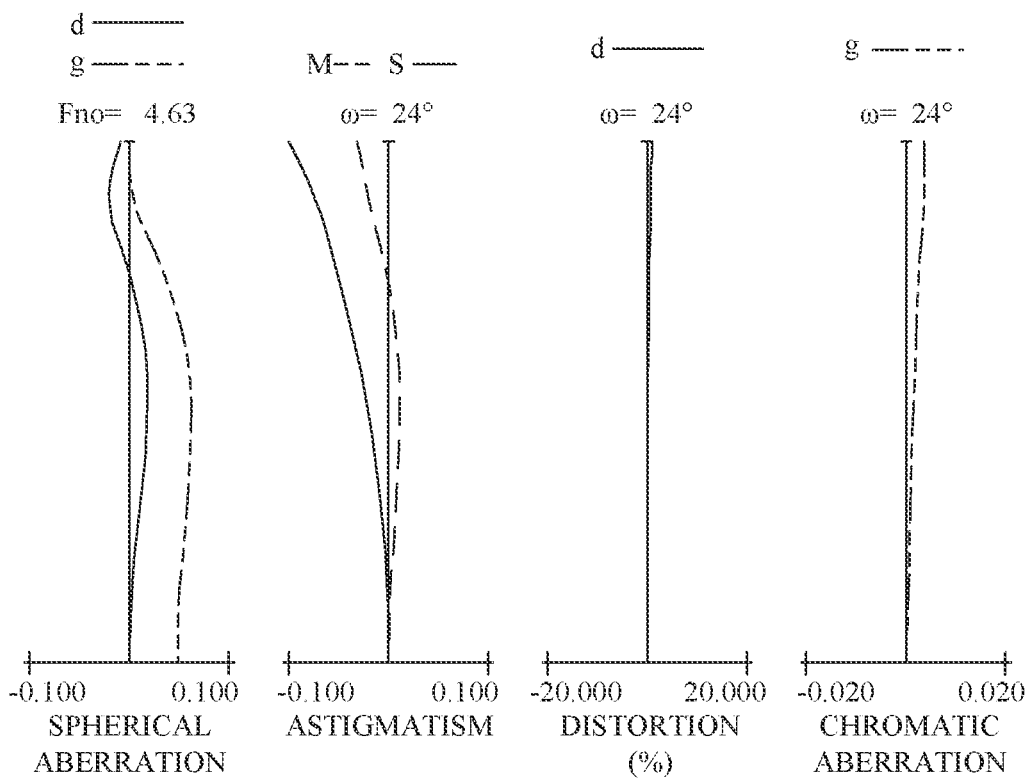
Figure 11:
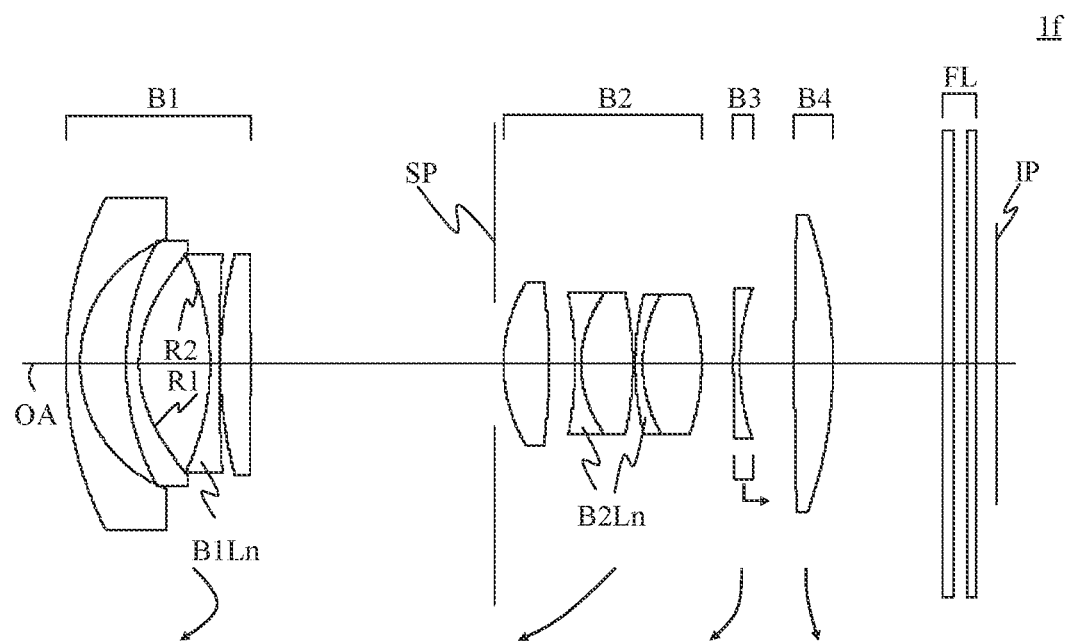
FIG. 11 is a sectional view of a zoom lens in an in-focus state at infinity according to Example 6.
Figure 12A:
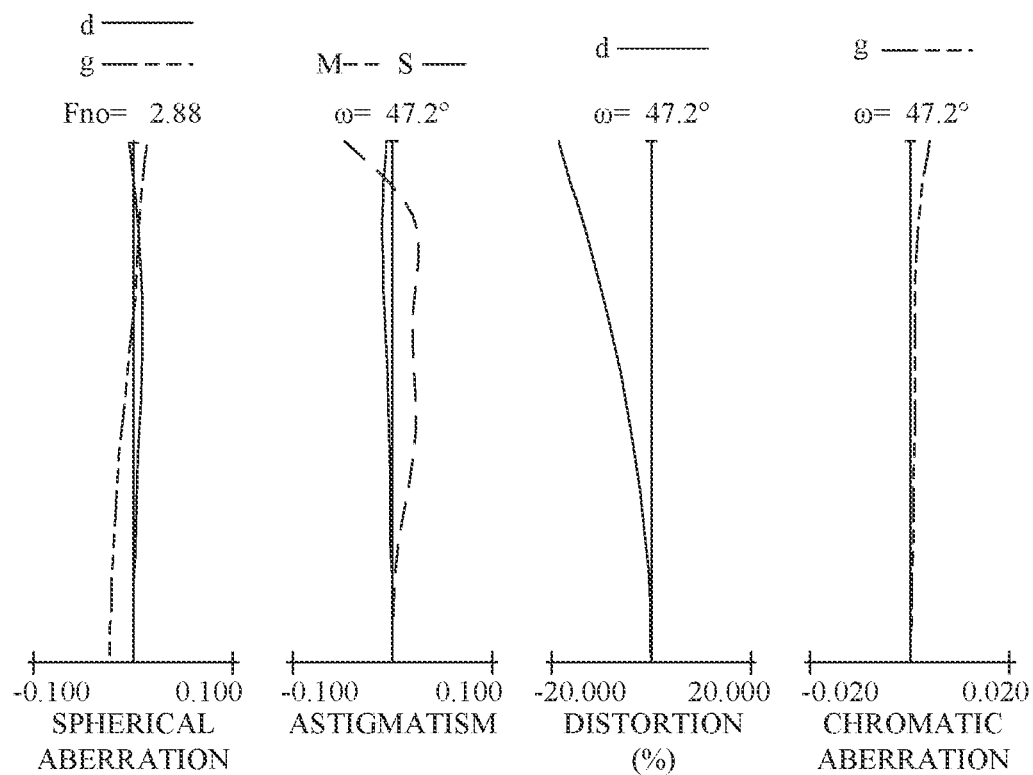
FIGS. 12A to 12C are longitudinal aberration diagrams of the zoom lens at a wide-angle end, a middle zoom position, and a telephoto end in the in-focus state at infinity according to Example 6.
Figure 12B:
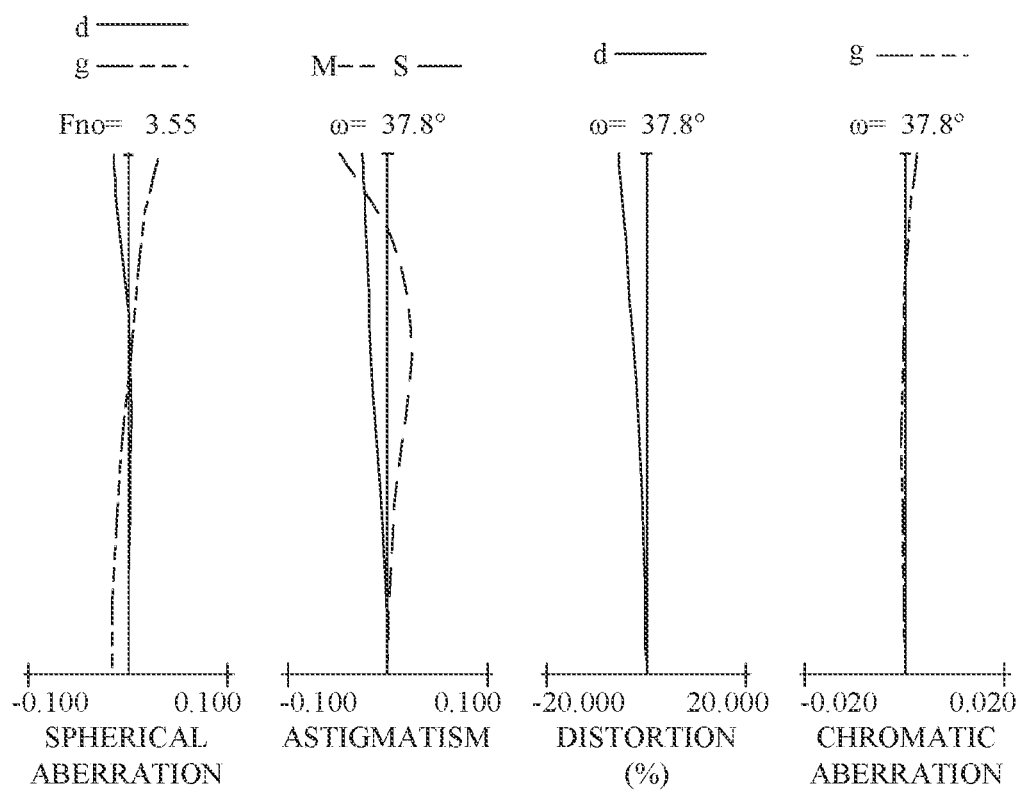
Figure 12C:
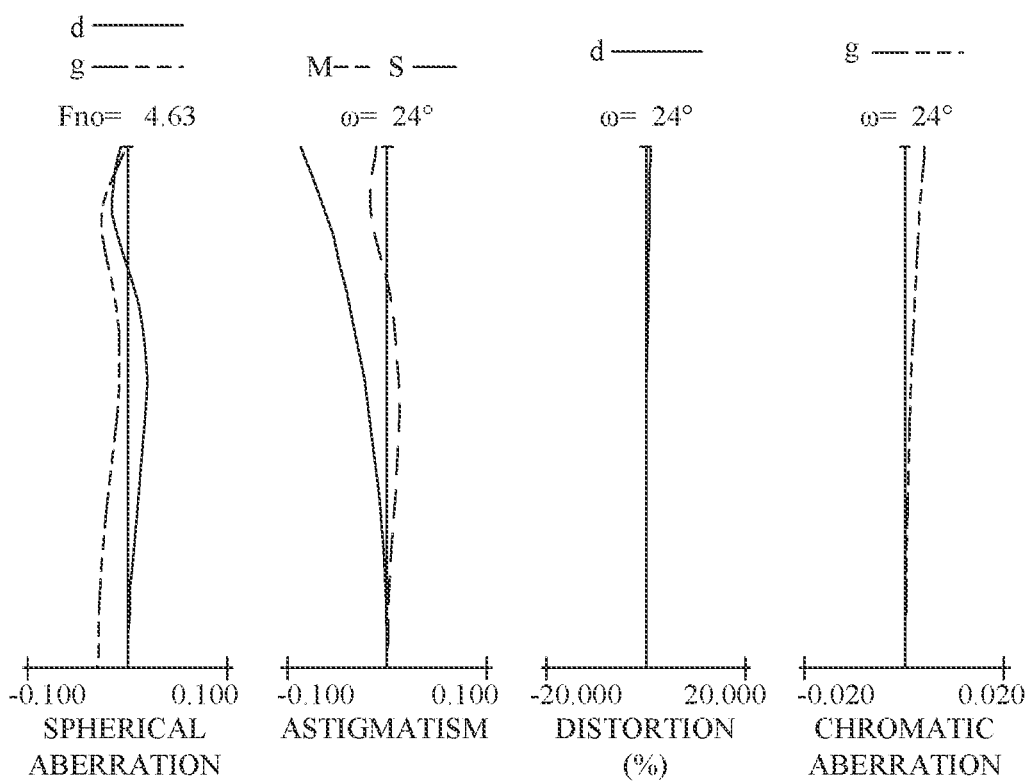
Figure 13:
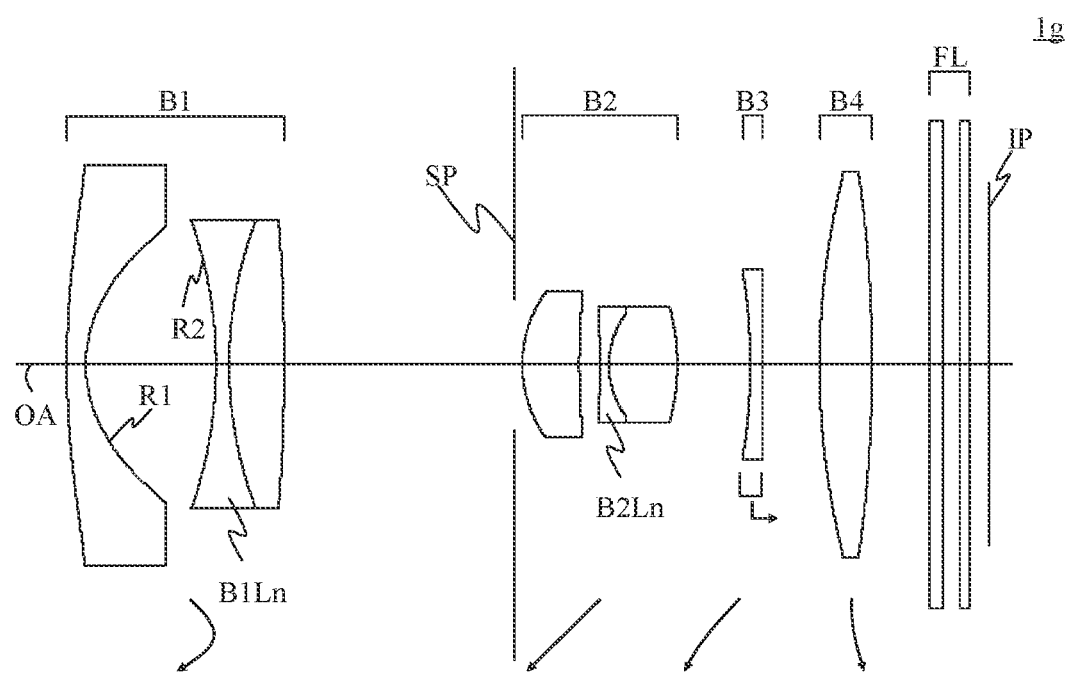
FIG. 13 is a sectional view of a zoom lens in an in-focus state at infinity according to Example 7.
Figure 14A:
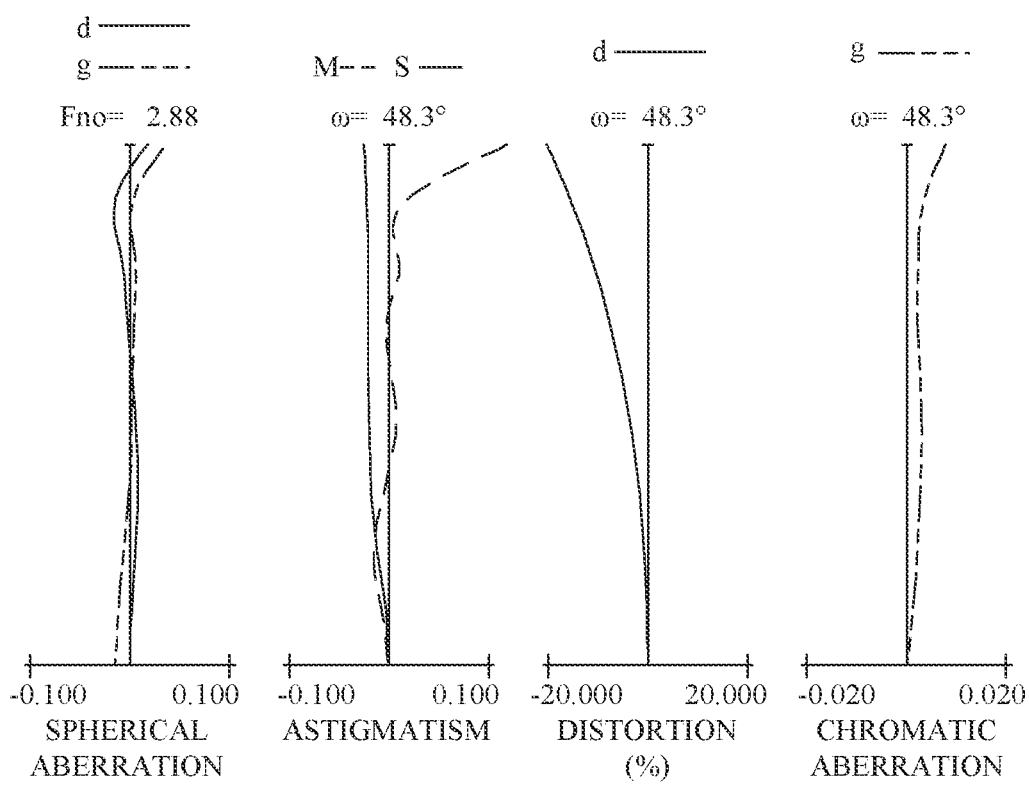
FIGS. 14A to 14C are longitudinal aberration diagrams of the zoom lens at a wide-angle end, a middle zoom position, and a telephoto end in the in-focus state at infinity according to Example 7.
Figure 14B:
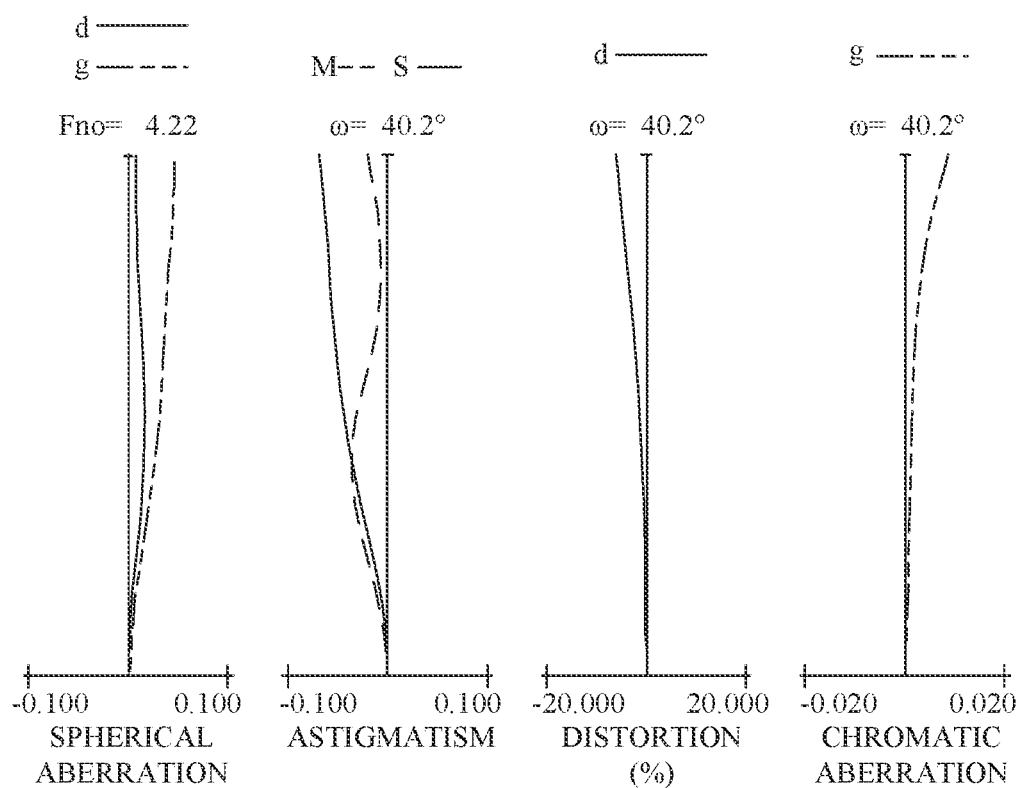
Figure 14C:
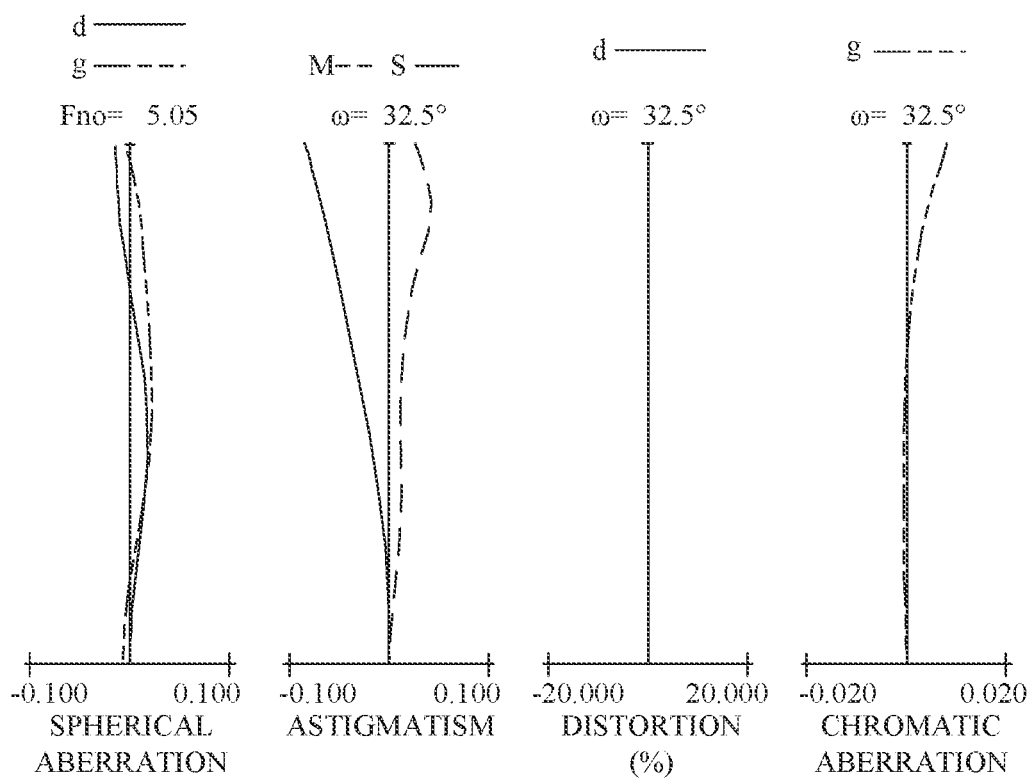
Figure 15:
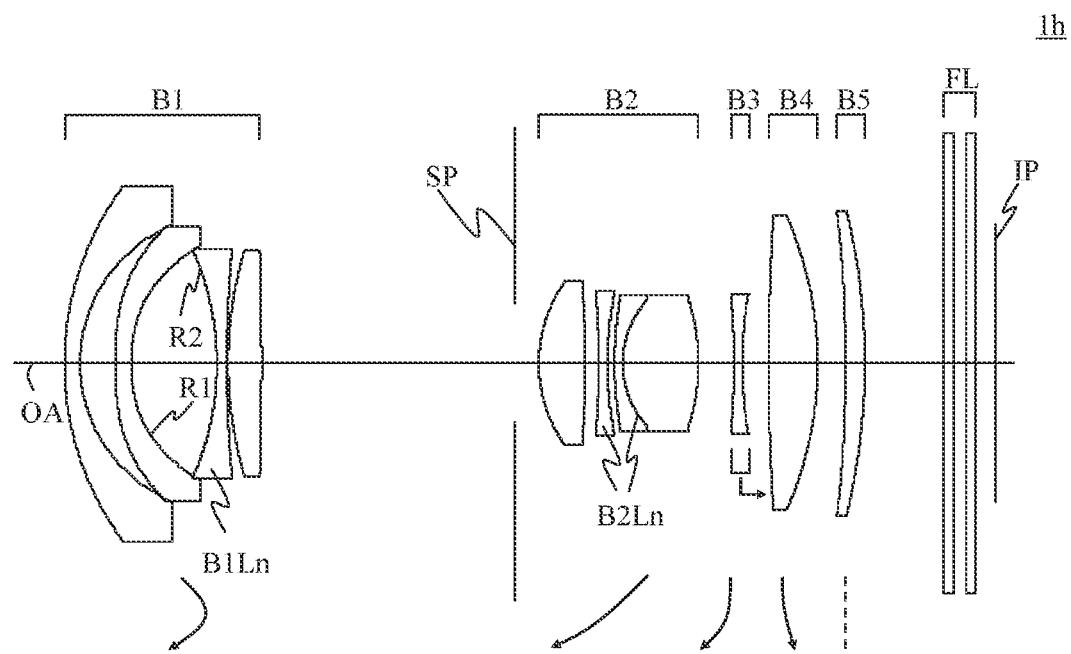
FIG. 15 is a sectional view of a zoom lens in an in-focus state at infinity according to Example 8.
Figure 16A:
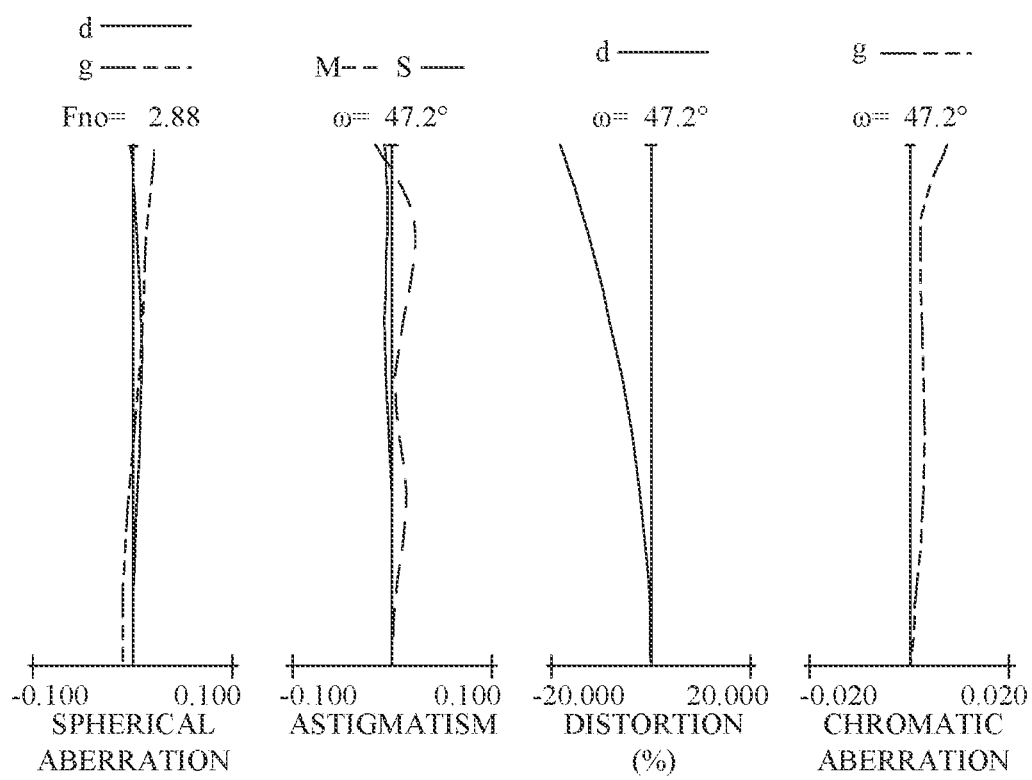
FIGS. 16A to 16C are longitudinal aberration diagrams of the zoom lens at a wide-angle end, a middle zoom position, and a telephoto end in the in-focus state at infinity according to Example 8.
Figure 16B:
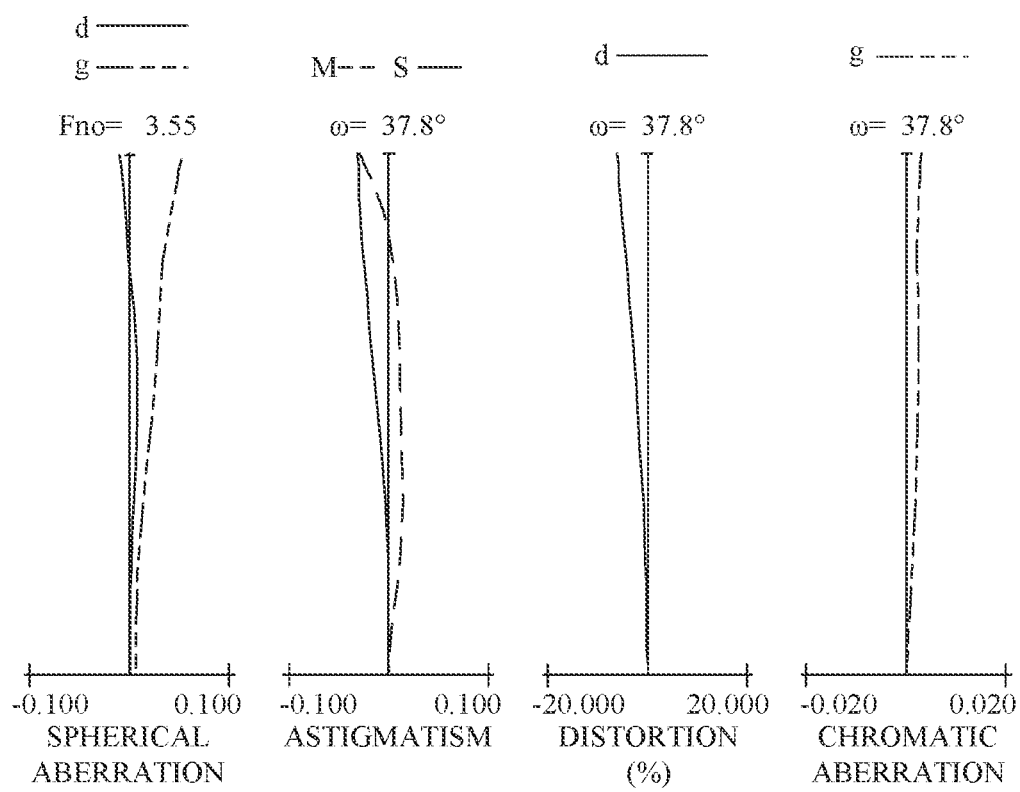
Figure 16C:
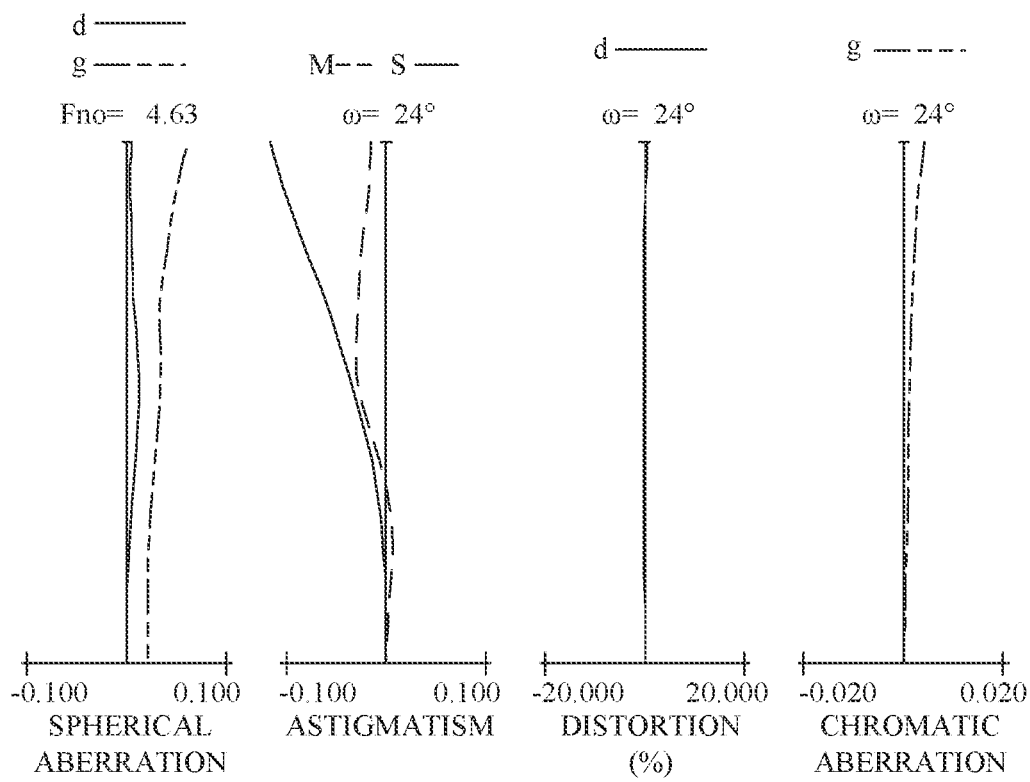
Figure 17:
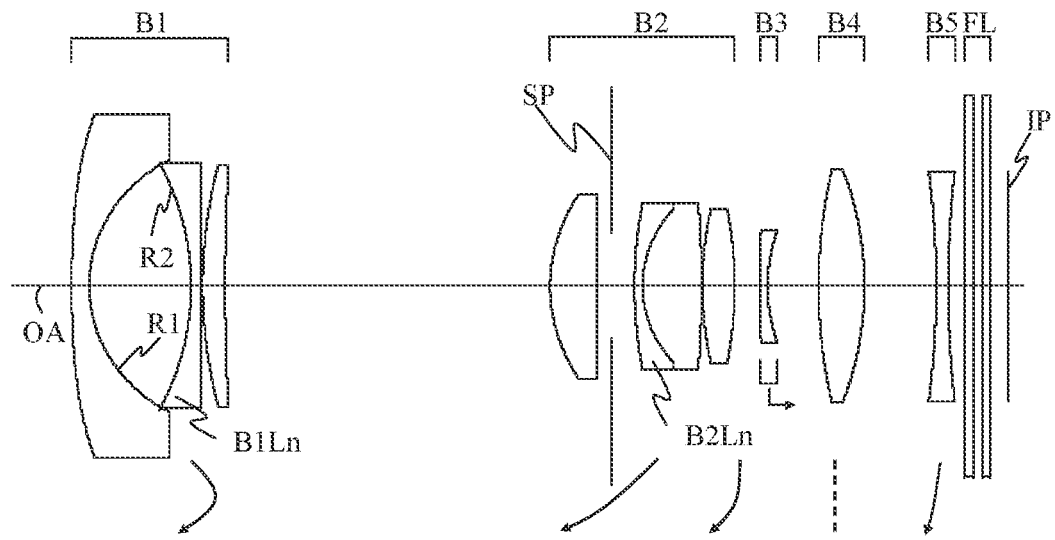
FIG. 17 is a sectional view of a zoom lens in an in-focus state at infinity according to Example 9.
Figure 18A:
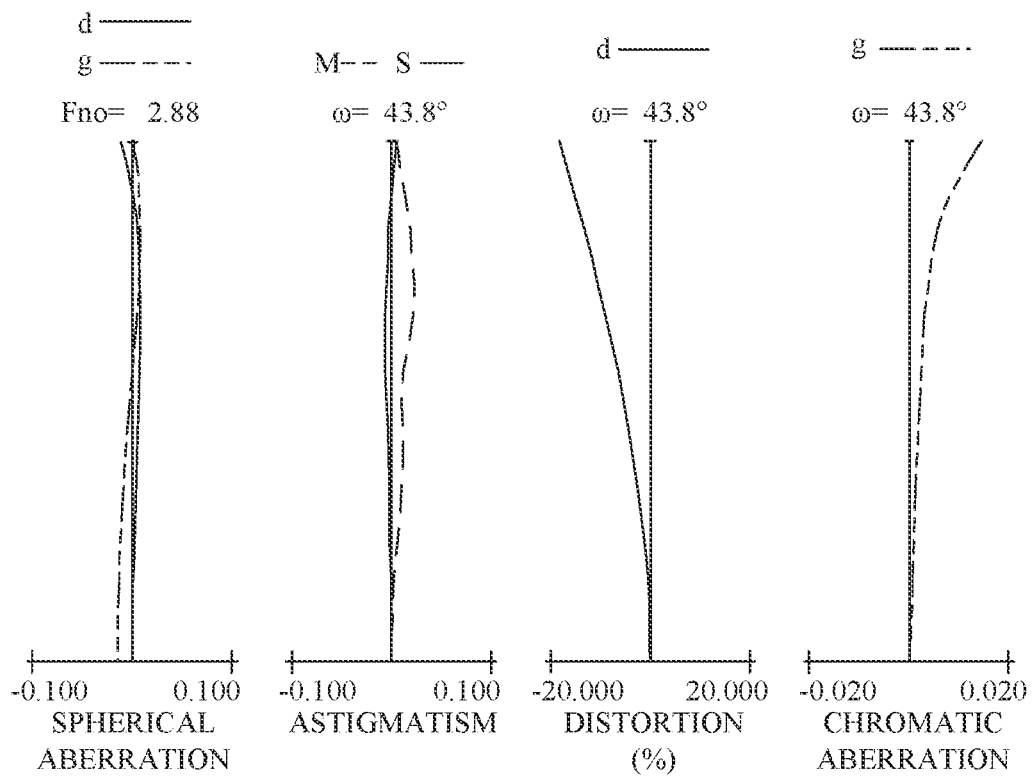
FIGS. 18A to 18C are longitudinal aberration diagrams of the zoom lens at a wide-angle end, a middle zoom position, and a telephoto end in the in-focus state at infinity according to Example 9.
Figure 18B:
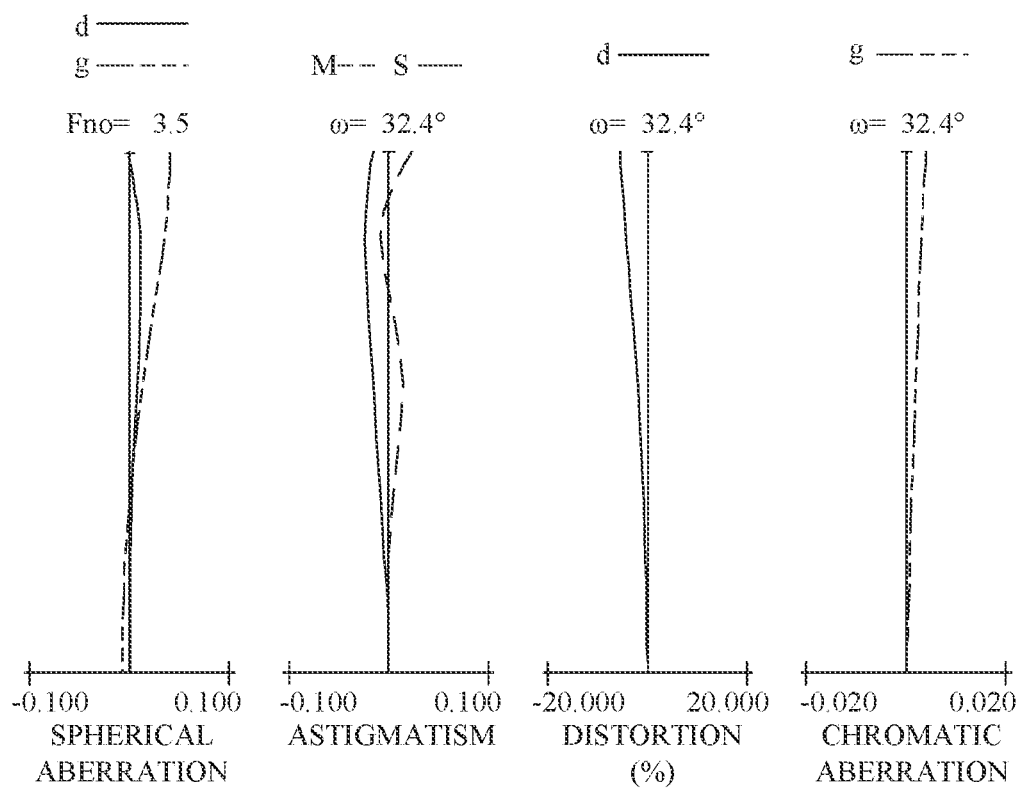
Figure 18C:
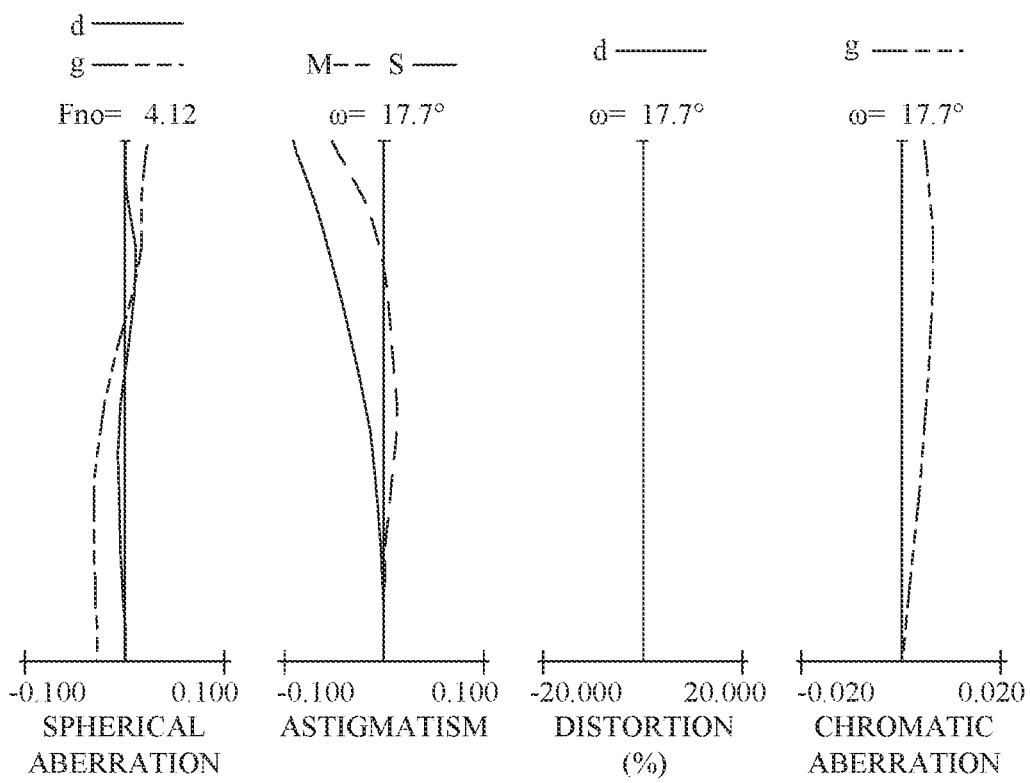

FIG. 3 is a sectional view of a zoom lens 1b at a wide-angle end in an in-focus state at infinity according to Example 2. FIGS. 4A to 4C are longitudinal aberration diagrams of the zoom lens 1b at the wide-angle end, a middle zoom position, and a telephoto end, respectively. FIG. 5 is a sectional view of a zoom lens 1c at a wide-angle end in an in-focus state at infinity according to Example 3. FIGS. 6A to 6C are longitudinal aberration diagrams of a zoom lens 1c at the wide-angle end, a middle zoom position, and a telephoto end, respectively. FIG. 7 is a sectional view of a zoom lens 1d at a wide-angle end in an in-focus state at infinity according to Example 4. FIGS. 8A to 8C are longitudinal aberration diagrams of the zoom lens 1d at the wide-angle end, a middle zoom position, and a telephoto end, respectively. FIG. 9 is a sectional view of a zoom lens 1e at the wide-angle end in an in-focus state at infinity according to Example 5. FIGS. 10A to 10C are longitudinal aberration diagrams of a zoom lens 1e at the wide-angle end, a middle zoom position, and a telephoto end, respectively. FIG. 11 is a sectional view of a zoom lens 1f at a wide-angle end in an in-focus state at infinity according to Example 6. FIGS. 12A to 12C are longitudinal aberration diagrams of the zoom lens 1f at the wide-angle end, a middle zoom position, and a telephoto end, respectively. FIG. 13 is a sectional view of a zoom lens 1g at a wide-angle end in an in-focus state at infinity according to Example 7. FIGS. 14A to 14C are longitudinal aberration diagrams of the zoom lens 1g at the wide-angle end, a middle zoom position, and a telephoto end, respectively. FIG. 15 is a sectional view of a zoom lens 1h at a wide-angle end in an in-focus state at infinity according to Example 8. FIGS. 16A to 16C are longitudinal aberration diagrams of the zoom lens 1h at the wide-angle end, a middle zoom position, and a telephoto end, respectively. FIG. 17 is a sectional view of a zoom lens 1i at a wide-angle end in an in-focus state at infinity according to Example 9. FIGS. 18A to 18C are longitudinal aberration diagrams of the zoom lens 1i at the wide-angle end, a middle zoom position, and a telephoto end, respectively.

The zoom lenses 1a to 1i according to respective examples are optical systems suitable for image pickup apparatuses such as digital video cameras, digital still cameras, broadcasting cameras, film-based cameras, surveillance cameras, and in-vehicle cameras. In each sectional view, a left side is an object side (front) and a right side is an image side (rear). The optical system according to the examples may be used as a projection lens of a projector or the like. Then, a left side is a screen side (enlargement side) and a right side is a projected image side (reduction side).

The zoom lenses 1a to 1i according to the examples include a plurality of lens units. In each example, the lens unit is a group of lenses that integrally move or stop during zooming. That is, an optical system that drives part in a lens unit, such as a focus lens subunit that provides focusing with part of the lens unit and an image stabilization subunit that provides an image stabilization with part of the lens unit, includes a plurality of units that move similarly during zooming and thus they are regarded as one lens unit for explanation. The lens unit may include one or more lenses. The lens unit may also include a diaphragm (aperture stop). In each sectional view, i (i=natural number) represents the order of the lens units counted from the object side, and Bi represents an i-th lens unit.

SP represents a diaphragm (aperture stop). IP represents an image plane, on which an imaging plane of an image sensor (photoelectric conversion element), such as a CCD sensor or a CMOS sensor, is disposed when the zoom lenses 1a to 1i according to the examples are used as the imaging optical system for a digital still camera or a digital video camera. When the zoom lenses 1a to 1i according to the examples are used as the imaging optical system for the film-based camera, a photosensitive surface corresponding to the film surface is placed on the image plane IP. Arrows shown in each sectional view indicate moving directions of lens units during zooming from the wide-angle end to the telephoto end. FL represents an optical block corresponding to an optical filter, a face plate, a crystal low-pass filter, an infrared cut filter, and the like.

The spherical aberration diagram of each longitudinal aberration diagram shows a spherical aberration amount for the d-line (wavelength 587.6 nm) and the g-line (wavelength 435.8 nm), where Fno represents an F-number. In the astigmatism diagram, S represents a sagittal image plane and M represents a meridional image plane. The distortion diagram shows a distortion amount for the d-line. The chromatic aberration diagram shows a lateral chromatic aberration amount for the g-line. ω is an imaging half angle of view (°).

A description will be given of characteristic configurations of the zoom lenses 1a to 1i according to the examples. Each of the zoom lenses 1a to 1i according to the examples includes, in order from the object side to the image side, a first lens unit B1 having a negative refractive power, a second lens unit B2 having a positive refractive power, a third lens unit B3 having a negative refractive power, and a fourth lens unit B4 having a positive refractive power. The first lens unit B1 has a negative lens B1Ln with a concave surface facing the object side. There may be a plurality of negative lenses corresponding to the negative lens B1Ln.

The second lens unit B2 has at least one negative lens. Hereinafter, each negative lens included in the second lens unit B2 will also be referred to as a negative lens B2Ln.

During zooming from the wide-angle end to the telephoto end, the first lens unit B1 moves, and the fourth lens unit B4 is fixed or moves from the object side to the image side.

The zoom lenses 1a to 1i satisfy the following conditional expressions (1) and (2):

$$-1.50 < f1/D1 < -0.20 \qquad (1)$$

$$1.870 < nLnave < 2.500 \qquad (2)$$

where f1 is a focal length of the first lens unit B1, D1 is a distance on the optical axis from the surface closest to the object to the surface closest to the image plane of the first lens unit B1, and nLnave is an average refractive index of all negative lenses included in the second lens unit B2.

A configuration that includes, in order from the object side to the image side, the four lens units having negative, positive, negative, and positive refractive powers is obtained by dividing a positive rear unit in a so-called retrofocus configuration consisting of a negative front unit and the positive rear unit by a unit on an image side of the second lens unit B2. This configuration can provide a wide angle while ensuring the backfocus. In addition, the aberration fluctuation during magnification variation can be reduced.

The negative lens B1Ln with a concave surface facing the object side of the first lens unit B1 reduces the distortion at the wide-angle end. The second lens unit B2 includes at least one negative lens B2Ln and reduces aberration fluctuations, such as the longitudinal chromatic aberration and the curvature of field, during zooming.

Moving the first lens unit B1 during zooming can reduce aberrations at the middle zoom position. During zooming, the positive fourth lens unit B4 is fixed or moved from the object side to the image side to reduce the moving amount and the refractive power of the second lens unit B2 and thereby the overall lens length, and to correct the aberrations. Here, if the fourth lens unit B4 having a positive refractive power moves from the image side to the object side during zooming, the magnification variation ratio decreases. In order to achieve a magnification variation ratio similar to that of the zoom lens in each example, it is necessary to increase the moving amount or the refractive power of the second lens unit B2, and it becomes difficult to reduce the overall lens length and to correct the aberrations. The fourth lens unit B4 may include a single lens, a cemented lens, or a plurality of lenses.

A description will be given of technical meanings of the above conditional expressions. The conditional expression (1) defines a ratio of the focal length f1 of the first lens unit B1 to the distance D1 on the optical axis from the surface closest to the object to the surface closest to the image plane of the first lens unit B1. Satisfying the conditional expression (1) can provide the zoom lenses 1a to 1i with a wide angle. If the value is lower than the lower limit in the conditional expression (1), the refractive power of the first lens unit B1 becomes small, the wide-angle scheme becomes difficult or the first lens unit B1 becomes too thin and it becomes difficult to correct the distortion and the curvature of field at the wide-angle end. On the other hand, if the value is higher than the upper limit in the conditional expression (1), the refractive power of the first lens unit B1 becomes too large and it becomes difficult to correct the aberrations such as curvature of field, or the first lens unit B1 becomes too thick and it is difficult to reduce the size particularly during retracting when the retractable structure is adopted.

The conditional expression (2) defines an average refractive index of all negative lens(es) B2Ln in the second lens unit B2. If the value is lower than the lower limit in the conditional expression (2), the curvature of the negative lens B2Ln becomes large, and it becomes difficult to correct the aberrations such as the astigmatism, the spherical aberration, and the coma. In order to obtain the negative refractive power required to correct the aberration, a large number of negative lenses are required, and the second lens unit B2 becomes large. On the other hand, if the value is higher than the upper limit in the conditional expression (2), the correction of the aberrations such as astigmatism, spherical aberration, and coma become excessive.

In each example, the numerical ranges of the conditional expressions (1) and (2) may be changed to those of the following conditional expressions (1a) and (2a).

$$-1.35 < f1/D1 < -0.50 \quad (1a)$$

$$1.875 < nLnave < 2.300 \quad (2a)$$

If the numerical ranges of the conditional expressions (1) and (2) are changed to those of the following conditional expressions (1b) and (2b), the effects of the above conditional expressions can be maximized $$-1.25 < f1/D1 < -0.65 \quad (1b)$$

$$1.875 < nLnave < 2.100 \quad (2b)$$

A description will now be given of a configuration to be satisfied by the zoom lens according to each example. The first lens unit B1 has an air gap on the object side of the negative lens B1Ln, and the air lens including the lens surfaces R1 and R2 adjacent to the air gap and the air gap has a biconvex shape. This structure corrects the distortion at the wide-angle end. The first lens unit B1 includes a negative lens, a negative lens, and a positive lens in this order from the object side. Thereby, the distortion, the curvature of field, and the lateral chromatic aberration are reduced at the wide-angle end. The first lens unit B1 has a negative lens having an aspherical shape. Thereby, the aberrations such as the distortion and the curvature of field are corrected.

The second lens unit B2 includes at least one cemented lens consisting of a negative lens and a positive lens. Thereby, the curvature of field and the lateral chromatic aberration are reduced. The cemented lens can reduce the aberration deterioration caused by manufacturing errors in the second lens unit B2, and manufacturing becomes easy. The second lens unit B2 moves from the image side to the object side during the magnification variation from the wide-angle end to the telephoto end. Thereby, it plays a major role in the magnification variation and increases the magnification variation ratio of the zoom lens. The second lens unit B2 includes a positive lens having an aspherical shape. Thereby, the spherical aberration, the coma, and the curvature of field are corrected.

In the third lens unit B3, the negative lens having an aspherical surface is moved from the object side to the image side during focusing from infinity to a close distance. Thereby, the aberration fluctuations caused by focusing can be suppressed. The third lens unit B3 may include a plurality of lenses.

A description will be given of the conditions that may be satisfied by the zoom lens according to each example. The zoom lenses 1a to 1i according to the examples may satisfy at least one of the following conditional expressions (3) to (12), where r1 is a radius of curvature of the surface R1 on the object side of the air lens formed at a position adjacent to the object side of the negative lens B1Ln, r2 is a radius of curvature of the surface R2 on the image side of the air lens, vd is an Abbe number of the negative lens B1Ln for the d-line, Dsum is a sum of distances on the optical axis from a surface closest to the object to a surface closest to the image plane for each lens unit in each of the zoom lenses 1a to 1i, Lw is a distance on the optical axis from a surface closest to the object to a surface closest to the image plane at the wide-angle end, Fno is an F-number at the wide-angle end, β4w is a lateral magnification of the fourth lens unit B4 at the wide-angle end, and β4t is a lateral magnification of the fourth lens unit B4 at the telephoto end. M2 and M4 are moving amounts of the second lens unit B2 and the fourth lens unit B4 from the wide-angle end to the telephoto end, respectively. Signs of the moving amounts M2 and M4 are positive in the moving direction of the light traveling direction (from the object side to the image side), fw is a focal length of the zoom lenses 1a to 1i (overall system) at the wide-angle end, f2 is a focal length of the second lens unit B2, ft, ωt, and BFt are a focal length, a half angle of view, and an air equivalent backfocus at the telephoto end, respectively.

$$0.10 < (r2+r1)/(r2-r1) < 0.80 \quad (3)$$

$$60.00 < vd < 100.00 \quad (4)$$

$$0.80 < (Dsum/Lw) \times Fno < 1.80 \quad (5)$$

$$1.00 \leq \beta 4t/\beta 4w < 1.40 \quad (6)$$

$$0.00 \leq M4/Lw \leq 0.15 \quad (7)$$

$$0.20 < fw/D1 < 0.90 \quad (8)$$

$$-2.40 < f1/fw < -1.20 \quad (9)$$

$$-1.30<f1/f2<-0.50 \quad (10)$$

$$-0.55<M2/Lw<-0.10 \quad (11)$$

$$0.20<BFt/(ft\times\tan \omega t)<1.40 \quad (12)$$

The conditional expression (3) defines a shape of the air lens of the first lens unit B1 adjacent to the object side of the negative lens B1Ln with the concave surface facing the object. Satisfying the conditional expression (3) can satisfactorily correct the distortion, the curvature of field, and the lateral chromatic aberration at the wide-angle end. If the value is higher than the upper limit in the conditional expression (3), the curvature of the lens becomes too large and manufacturing becomes difficult. On the other hand, if the value is lower than the lower limit in the conditional expression (3), the refractive power of the air lens becomes small and the correction of distortion is insufficient.

The conditional expression (4) defines an Abbe number for the d-line of the negative lens B1Ln with the concave surface facing the object in the first lens unit B1. Satisfying the conditional expression (4) can satisfactorily correct the lateral chromatic aberration at the wide-angle end. If the value is higher than the upper limit in the conditional expression (4), a material having a high refractive index cannot be selected, and it becomes difficult to correct the curvature of field. On the other hand, if the value is lower than the lower limit in the conditional expression (4), the correction of the lateral chromatic aberration is insufficient.

The conditional expression (5) defines a sum of the thicknesses on the optical axis of each lens unit in the zoom lenses 1a to 1i according to the F-number. Generally, when the F-number is small, a larger number of lenses are required to correct the aberrations than that when the F-number is large, and the Dsum tends to be large. Since Dsum corresponding to the thicknesses required to correct the aberrations when the F-number is small and large can be similarly expressed by multiplying it by the F-number, a proper thickness can be defined by a single conditional expression. Satisfying the conditional expression (5) can reduce the thickness of each lens unit, and sufficiently correct the aberration while reducing the overall length of the retracted zoom lens. If the value is higher than the upper limit in the conditional expression (5), the zoom lenses 1a to 1i become too thick, and the overall length of the retracted lens particularly increases. On the other hand, if the value is lower than the lower limit in the conditional expression (5), each lens unit becomes too thin, the wide-angle scheme becomes difficult, and the aberration significantly fluctuates during the magnification variation.

The conditional expression (6) defines a ratio of the lateral magnification at the wide-angle end and that at the telephoto end of the fourth lens unit B4. Satisfying the conditional expression (6) can reduce the moving amount of the second lens unit B2 and achieve the miniaturization. If the value is higher than the upper limit in the conditional expression (6), the moving amount of the fourth lens unit B4 from the object side to the image side during the magnification variation becomes too large, and backfocus cannot be secured. On the other hand, if the value is lower than the lower limit in the conditional expression (6), it is necessary to increase the moving amount of the second lens unit B2, the overall lens length becomes long or the refractive power of the second lens unit B2 becomes too large, and it is difficult to correct the spherical aberration, the curvature of field, and the coma.

The conditional expression (7) defines a moving amount of the fourth lens unit B4 during the magnification variation. Satisfying the conditional expression (7) can reduce the moving amount of the second lens unit B2 and achieve the miniaturization. If the value is higher than the upper limit in the conditional expression (7), the moving amount of the second lens unit B2 needs to be increased, and the overall lens length becomes long. On the other hand, if the value is lower than the lower limit in the conditional expression (7), the moving amount from the object side to the image side of the fourth lens unit B4 during the magnification variation becomes too large, and the backfocus cannot be secured.

The conditional expression (8) defines a ratio of the focal length at the wide-angle end to the thickness of the first lens unit B1 on the optical axis. Satisfying the conditional expression (8) can achieve the wide-angle scheme. If the value is higher than the upper limit in the conditional expression (8), it becomes difficult to achieve the wide angle. On the other hand, if the value is lower than the lower limit in the conditional expression (8), the wide angle becomes excessive and it becomes difficult to correct the aberration or the first lens unit B1 becomes too thick, and the overall length of the retracted lens becomes particularly long.

The conditional expression (9) defines a ratio between the focal length of the zoom lenses 1a to 1i (overall system) at the wide-angle end and the focal length of the first lens unit B1. Satisfying the conditional expression (9) can suppress the aberration while achieving the wide angle. If the value is higher than the upper limit in the conditional expression (9), the negative refractive power of the first lens unit B1 becomes too large, and it becomes difficult to correct the curvature of field. On the other hand, if the value is lower than the lower limit in the conditional expression (9), the negative refractive power of the first lens unit B1 becomes too small, and it becomes difficult to achieve the wide angle or the overall lens length becomes long.

The conditional expression (10) defines a ratio between the focal length of the first lens unit B1 and the focal length of the second lens unit B2. Satisfying the conditional expression (10) can reduce the moving amount of the second lens unit and achieve the miniaturization and the wide angle. If the value is higher than the upper limit in the conditional expression (10), the negative refractive power of the first lens unit B1 becomes large and it becomes difficult to correct the curvature of field, or the negative refractive power of the second lens unit B2 becomes small so that the moving amount of the second lens unit B2 during zooming becomes large and the overall lens length becomes long. On the other hand, if the value is lower than the lower limit in the conditional expression (10), the negative refractive power of the first lens unit B1 becomes too small and it becomes difficult to achieve the wide angle, or the negative refractive power of the second lens unit B2 becomes too large, and it becomes difficult to correct the spherical aberration, the curvature of field, and the coma.

The conditional expression (11) defines a moving amount of the second lens unit B2 during zooming. Satisfying the conditional expression (11) can reduce the overall lens length while increasing the magnification variation ratio. If the value is higher than the upper limit in the conditional expression (11), the refractive power of the second lens unit B2 becomes too large in order to secure the magnification variation ratio, and it becomes difficult to correct the spherical aberration, the curvature of field, and the coma. On the other hand, if the value is lower than the lower limit in the conditional expression (11), the magnification variation ratio becomes large, but the overall lens length becomes long.

The conditional expression (12) defines a backfocus at the telephoto end. Satisfying the conditional expression (12) can dispose the lens near the image plane having a large off-axis light height, and correct the curvature of field and astigmatism. If the value is higher than the upper limit in the conditional expression (12), the height of the off-axis light passing through the lens near the image plane becomes small, and the effect of correcting the curvature of field and the astigmatism becomes small. On the other hand, if the value is lower than the lower limit in the conditional expression (12), it becomes difficult to dispose the optical block FL corresponding to the optical filter, face plate, crystal low-pass filter, infrared cut filter, etc.

Each example may set the numerical ranges of the conditional expressions (3) to (12) as in the following conditional expressions (3a) to (12a), respectively.

$$0.15<(r2+r1)/(r2-r1)<0.70 \tag{3a}$$

$$62.00<vd<96.00 \tag{4a}$$

$$0.90<(Dsum/Lw)\times Fno<1.72 \tag{5a}$$

$$1.00\leq\beta 4t/\beta 4w<1.22 \tag{6a}$$

$$0.00\leq M4/Lw<0.12 \tag{7a}$$

$$0.30<fw/D1<0.80 \tag{8a}$$

$$-2.10<f1/fw<-1.30 \tag{9a}$$

$$-1.10<f1/f2<-0.60 \tag{10a}$$

$$-0.50<M2/Lw<-0.13 \tag{11a}$$

$$0.30<BFt/(ft\times \tan\omega t)<1.30 \tag{12a}$$

Each example may set the numerical ranges of the conditional expressions (3) to (12) as in the following conditional expressions (3b) to (12b) to maximize the effect of each conditional expression.

$$0.20<(r2+r1)/(r2-r1)<0.58 \tag{3b}$$

$$63.00<vd<90.00 \tag{4b}$$

$$1.05<(Dsum/Lw)\times Fno<1.67 \tag{5b}$$

$$1.00\leq\beta 4t/\beta 4w<1.88 \tag{6b}$$

$$0.00\leq M4/Lw<0.09 \tag{7b}$$

$$0.35<fw/D1<0.72 \tag{8b}$$

$$-1.95<f1/fw<--1.45 \tag{9b}$$

$$-1.05<f1/f2<-0.67 \tag{10b}$$

$$-0.40<M2/Lw<-0.15 \tag{11b}$$

$$0.40<BFt/(ft\times \tan\omega t)<1.20 \tag{12b}$$

A detailed description will be given of features other than those described above in the zoom lenses 1a to 1i according to the examples. In Examples 1 to 9, during zooming from the wide-angle end to the telephoto end, the first lens unit B1 and the second lens unit B2 provide the main magnification variation by moving so that the distance between them becomes smaller. The second lens unit B2 and the third lens unit B3 move so as to increase the distance between them, thereby suppressing the fluctuation of the curvature of field during zooming. By moving the second lens unit B2 having a positive refractive power so as to have a component in a direction orthogonal to the optical axis OA, the image is displaced in the direction orthogonal to the optical axis OA to correct the image blur. The image blur may be corrected by moving part of the second lens unit B2 so as to have a component in the direction orthogonal to the optical axis OA.

In Examples 1 and 7, the first lens unit B1 has a cemented lens consisting of a negative lens and a positive lens. Thereby, the deterioration of aberration caused by the manufacturing errors of the first lens unit B1 can be reduced, and manufacturing becomes easier.

In Examples 1, 3, 7, and 9, the first lens unit B1 includes a negative lens, a negative lens, and a positive lens. The negative lens closest to the object has an aspherical shape. Thereby, the distortion, the curvature of field, the astigmatism, and the coma are corrected.

In Examples 2, 4, 5, 6 and 8, the first lens unit B1 includes a negative lens, a negative lens, a negative lens, and a positive lens. The second negative lens from the object side has an aspherical shape. Thereby, the aperture of the aspherical lens can be reduced and the manufacturing cost can be reduced while the distortion, the curvature of field, the astigmatism, and the coma are corrected.

Example 8 includes the fifth lens unit B5 having a positive refractive power. Thereby, the curvature of field can be corrected. In addition, the incident angle of the off-axis light on the image plane can be reduced. The positive lens forming the fifth lens unit B5 may include an aspherical shape to enhance the above effect. The fifth lens unit B5 may include a plurality of lenses, or may be moved during zooming to correct the curvature of field.

Example 9 includes the fifth lens unit B5 having a negative refractive power. Thereby, the overall lens length can be reduced.

Numerical examples 1 to 9 corresponding to Examples 1 to 9 will now be shown. In surface data of each numerical example, r represents a radius of curvature of each optical surface, and d (mm) represents an axial distance (distance on the optical axis) between an m-th surface and a (m+1)-th surface, where m is the number of the surface counted from the light incident side, nd represents a refractive index of each optical element for the d-line, and vd represents an Abbe number of the optical element. The Abbe number vd of a certain material is expressed as:

$$vd=(Nd-1)/(NF-NC)$$

where Nd, NF, NC, and Ng are refractive indexes for the d-line (587.6 nm), the F-line (486.1 nm), the C-line (656.3 nm), and the g-line (wavelength 435.8 nm) in the Fraunhofer line.

In each numerical example, all of d, a focal length (mm), an F-number, and a half angle of view (°) have values when the optical system in each example focuses on an object at infinity (infinity object). The backfocus BF is an air equivalent distance from the final lens surface to the image surface. The overall lens length is a value obtained by adding the backfocus to the distance from the first lens surface to the final lens surface. When the optical surface is an aspherical surface, a * symbol is attached to the right side of the surface number. The aspherical shape is expressed as follows:

$$x=(h^2/R)/[1+\{1-(1+k)(h/R)^2\}^{1/2}+A4\times h^4+A6\times h^6+A8\times h^8+A10\times h^{10}+A12\times h^{12}$$

where X is a displacement amount from the surface apex in the optical axis direction, h is a height from the optical axis in the direction orthogonal to the optical axis, R is a paraxial radius of curvature, k is a conical constant, A4, A6, A8, A10, and A12 are aspherical coefficients of each order. In addition, "e±XX" in each aspherical coefficient means "x10$^{\pm XX}$."

NUMERICAL EXAMPLE 1

| | UNIT: mm | | | |
|---|---|---|---|---|
| | Surface Data | | | |
| Surface No. | r | d | nd | vd |
| 1* | 24.469 | 0.85 | 1.88202 | 37.2 |
| 2* | 5.270 | 5.12 | | |
| 3 | −13.042 | 0.55 | 1.51633 | 64.1 |
| 4 | 15.996 | 2.20 | 2.00100 | 29.1 |
| 5 | −55.489 | (Variable) | | |
| 6 (Diaphragm) | ∞ | 0.30 | | |
| 7* | 5.724 | 2.34 | 1.85135 | 40.1 |
| 8* | 46.456 | 1.02 | | |
| 9 | 165.815 | 0.40 | 2.00330 | 28.3 |
| 10 | 4.081 | 2.72 | 1.59282 | 68.6 |
| 11 | −9.494 | (Variable) | | |
| 12 | −17.126 | 0.50 | 1.76802 | 49.2 |
| 13* | −129.193 | (Variable) | | |
| 14 | 28.782 | 2.70 | 1.72916 | 54.7 |
| 15 | −47.021 | (Variable) | | |
| 16 | ∞ | 0.59 | 1.51633 | 64.1 |
| 17 | ∞ | 0.71 | | |
| 18 | ∞ | 0.50 | 1.51633 | 64.1 |
| 19 | ∞ | (Variable) | | |
| Image Plane | ∞ | | | |

| ASPHERIC DATA |
|---|
| 1st Surface |
| K = 0.00000e+000 A4 = −8.36439e−005 A6 = 3.41103e−006 A8 = −9.54119e−008 A10 = 1.28048e−009 A12 = −7.35758e−012 |
| 2nd Surface |
| K = −1.24102e+000 A4 = 5.48667e−004 A6 = 1.16108e−005 A8 = −1.97426e−007 A10 = 3.70591e−009 A12 = 9.34613e−011 A14 = −4.05034e−012 |
| 7th Surface |
| K = 0.00000e+000 A4 = 1.64476e−004 A6 = 3.78316e−005 A8 = −2.00105e−006 A10 = 2.94231e−007 |
| 8th Surface |
| K = 0.00000e+000 A4 = 1.08433e−003 A6 = 7.32778e−005 A8 = −5.20671e−006 A10 = 9.54190e−007 |
| 13th Surface |
| K = 0.00000e+000 A4 = 3.19027e−004 A6 = −4.58444e−006 A8 = 1.72664e−007 A10 = −4.28575e−009 |

| VARIOUS DATA | | | |
|---|---|---|---|
| Zoom Ratio | 2.06 | | |
| | Wide-Angle | Middle | Telephoto |
| Focal Length: | 6.00 | 9.05 | 12.38 |
| F-Number: | 2.88 | 4.22 | 5.05 |
| Half Angle of View: | 46.45 | 39.34 | 32.51 |
| Image Height: | 6.31 | 7.42 | 7.89 |
| Overall Lens Length: | 36.45 | 35.67 | 37.03 |
| BF | 4.32 | 4.10 | 3.63 |
| d5 | 7.64 | 3.16 | 0.82 |
| d11 | 3.34 | 4.24 | 5.16 |
| d13 | 2.45 | 5.48 | 8.72 |
| d15 | 1.70 | 1.47 | 1.00 |
| d19 | 1.20 | 1.20 | 1.20 |

| Zoom Lens Unit Data | | |
|---|---|---|
| Lens Unit | Starting Surface | Focal Length: |
| 1 | 1 | −9.26 |
| 2 | 6 | 9.48 |
| 3 | 12 | −25.76 |
| 4 | 14 | 24.86 |

NUMERICAL EXAMPLE 2

UNIT: mm

Surface Data

| Surface No. | r | d | nd | vd |
|---|---|---|---|---|
| 1 | 18.235 | 0.90 | 1.95375 | 32.3 |
| 2 | 8.426 | 2.00 | | |
| 3* | 19.344 | 0.85 | 1.59201 | 67.0 |
| 4* | 8.427 | 4.82 | | |
| 5 | −16.371 | 0.55 | 1.59282 | 68.6 |
| 6 | 98.105 | 0.10 | | |
| 7 | 23.584 | 1.77 | 1.89286 | 20.4 |
| 8 | −487.486 | (Variable) | | |
| 9 (Diaphragm) | ∞ | (Variable) | | |
| 10* | 7.727 | 2.76 | 1.83441 | 37.3 |
| 11* | −46.210 | 0.97 | | |
| 12 | 1166.166 | 0.45 | 2.00330 | 28.3 |
| 13 | 5.309 | 4.74 | 1.49700 | 81.5 |
| 14 | −10.699 | (Variable) | | |
| 15 | ∞ | 0.50 | 1.76802 | 49.2 |
| 16* | 23.042 | (Variable) | | |
| 17 | −86.366 | 1.90 | 1.72916 | 54.7 |
| 18 | −19.555 | (Variable) | | |
| 19 | ∞ | 0.59 | 1.51633 | 64.1 |
| 20 | ∞ | 0.71 | | |
| 21 | ∞ | 0.50 | 1.51633 | 64.1 |
| 22 | ∞ | (Variable) | | |
| Image Plane | ∞ | | | |

ASPHERIC DATA

3rd Surface

K = 0.00000e+000 A 4 = 8.05532e−004 A 6 = −2.26658e−005
A 8 = 5.39564e−007 A 10 = −6.98064e−009 A 12 = 3.63960e−011
A 14 = −7.49084e−015

4th Surface

K = 0.00000e+000 A 4 = 7.52191e−004 A 6 = −1.73757e−005
A 8 = −9.72510e−008 A 10 = 2.34512e−008 A 12 = −6.48403e−010
A 14 = 5.45807e−012

10th Surface

K = 0.00000e+000 A 4 = −7.89213e−005 A 6 = −1.20641e−006
A 8 = 2.25737e−007 A 10 = −1.40333e−008 A 12 = 3.88982e−010

11th Surface

K = 0.00000e+000 A 4 = 2.61052e−004 A 6 = −1.74853e−006
A 8 = 2.19879e−007 A 10 = −1.39561e−008 A 12 = 4.53221e−010

16th Surface

K = 0.00000e+000 A 4 = 1.52183e−004 A 6 = −9.45471e−006
A 8 = 1.79871e−006 A 10 = −1.98846e−007 A 12 = 1.10274e−008
A 14 = −2.40167e−010

VARIOUS DATA
Zoom Ratio 2.95

| | Wide-Angle | Middle | Telephoto |
|---|---|---|---|
| Focal Length: | 6.00 | 9.54 | 17.70 |
| F-Number: | 2.88 | 3.55 | 4.63 |
| Half Angle of View: | 47.20 | 38.00 | 24.03 |
| Image Height: | 6.48 | 7.46 | 7.89 |
| Overall Lens Length: | 53.14 | 50.66 | 55.13 |
| BF | 10.09 | 10.22 | 8.91 |
| d 8 | 13.35 | 7.68 | 2.31 |
| d 9 | 3.27 | 1.38 | 1.00 |
| d14 | 1.60 | 3.97 | 9.14 |
| d16 | 2.54 | 5.11 | 11.47 |
| d18 | 7.46 | 7.59 | 6.28 |
| d22 | 1.20 | 1.20 | 1.20 |

UNIT: mm

Zoom Lens Unit Data

| Lens Unit | Starting Surface | Focal Length: |
|---|---|---|
| 1 | 1 | −9.64 |
| 2 | 10 | 12.28 |
| 3 | 15 | −30.00 |
| 4 | 17 | 34.26 |

NUMERICAL EXAMPLE 3

UNIT: mm

Surface Data

| Surface No. | r | d | nd | vd |
|---|---|---|---|---|
| 1* | 25.258 | 0.95 | 1.88202 | 37.2 |
| 2* | 6.566 | 5.77 | | |
| 3 | −19.525 | 0.60 | 1.49700 | 81.5 |
| 4 | 20.269 | 1.03 | | |
| 5 | 24.493 | 2.06 | 2.00069 | 25.5 |
| 6 | −547.446 | (Variable) | | |
| 7 (Diaphragm) | ∞ | 0.50 | | |
| 8* | 10.247 | 4.34 | 1.76802 | 49.2 |
| 9* | −41.304 | 2.51 | | |
| 10 | −32.219 | 0.40 | 1.90366 | 31.3 |
| 11 | 7.557 | 4.11 | 1.49700 | 81.5 |
| 12 | −21.857 | 0.12 | | |
| 13 | 33.130 | 2.18 | 1.59282 | 68.6 |
| 14 | −13.578 | (Variable) | | |
| 15 | −255.670 | 0.50 | 1.85135 | 40.1 |
| 16* | 18.584 | (Variable) | | |
| 17 | 36.750 | 2.93 | 1.72916 | 54.7 |
| 18 | −31.544 | (Variable) | | |
| 19 | ∞ | 0.59 | 1.51633 | 64.1 |
| 20 | ∞ | 0.71 | | |
| 21 | ∞ | 0.50 | 1.51633 | 64.1 |
| 22 | ∞ | (Variable) | | |
| Image Plane | ∞ | | | |

ASPHERIC DATA

1st Surface

K = 0.00000e+000 A 4 = −1.22721e−004 A 6 = 1.20429e−006
A 8 = −8.66153e−009 A 10 = 2.42431e−011

2nd Surface

K = −1.24102e+000 A 4 = 1.85134e−004 A 6 = −6.19690e−007
A 8 = 5.26362e−008 A 10 = −6.70983e−010 A 12 = 2.05427e−012

8th Surface

K = 0.00000e+000 A 4 = 7.91374e−007 A 6 = 2.32034e−006
A 8 = −4.76346e−008 A 10 = 2.49179e−009

9th Surface

K = 0.00000e+000 A 4 = 2.35429e−004 A 6 = 3.52727e−006
A 8 = −1.07827e−007 A 10 = 6.39260e−009

16th Surface

K = 0.00000e+000 A 4 = 1.57240e−004 A 6 = −1.16117e−006
A 8 = −3.93052e−011 A 10 = 1.65927e−009 A 12 = −5.36031e−011

VARIOUS DATA
Zoom Ratio 2.10

| | Wide-Angle | Middle | Telephoto |
|---|---|---|---|
| Focal Length: | 6.00 | 9.07 | 12.57 |
| F-Number: | 2.06 | 3.50 | 4.12 |
| Half Angle of View: | 46.45 | 39.27 | 32.11 |

-continued

UNIT: mm

| Image Height: | 6.31 | 7.42 | 7.89 |
|---|---|---|---|
| Overall Lens Length: | 53.86 | 50.99 | 51.26 |
| BF | 6.43 | 6.08 | 5.76 |
| d 6 | 13.68 | 6.38 | 2.23 |
| d14 | 2.46 | 4.27 | 6.22 |
| d16 | 3.29 | 6.26 | 9.05 |
| d18 | 3.80 | 3.45 | 3.13 |
| d22 | 1.20 | 1.20 | 1.20 |

Zoom Lens Unit Data

| Lens Unit | Starting Surface | Focal Length: |
|---|---|---|
| 1 | 1 | −10.06 |
| 2 | 7 | 12.96 |
| 3 | 15 | −20.33 |
| 4 | 17 | 23.71 |

NUMERICAL EXAMPLE 4

UNIT: mm

Surface Data

| Surface No. | r | d | nd | vd |
|---|---|---|---|---|
| 1* | 35.476 | 1.40 | 1.49710 | 81.6 |
| 2* | 11.759 | 3.65 | | |
| 3 | 30.859 | 1.00 | 1.81600 | 46.6 |
| 4 | 9.361 | 6.71 | | |
| 5 | −17.261 | 0.75 | 1.49700 | 81.5 |
| 6 | −354.700 | 0.10 | | |
| 7 | 30.067 | 2.12 | 1.96300 | 24.1 |
| 8 | 176.162 | (Variable) | | |
| 9 (Diaphragm) | ∞ | 0.50 | | |
| 10* | 10.071 | 3.42 | 1.61881 | 63.9 |
| 11* | −37.037 | 3.19 | | |
| 12 | −52.610 | 0.50 | 1.88100 | 40.1 |
| 13 | 7.624 | 3.61 | 1.49700 | 81.5 |
| 14 | −25.637 | 0.10 | | |
| 15 | 22.723 | 1.78 | 1.59282 | 68.6 |
| 16 | −22.742 | (Variable) | | |
| 17 | 57.767 | 0.55 | 1.88202 | 37.2 |
| 18* | 16.033 | (Variable) | | |
| 19 | 2843.253 | 1.90 | 1.81600 | 46.6 |
| 20 | −28.065 | (Variable) | | |
| 21 | ∞ | 0.59 | 1.51633 | 64.1 |
| 22 | ∞ | 0.71 | | |
| 23 | ∞ | 0.50 | 1.51633 | 64.1 |
| 24 | ∞ | (Variable) | | |
| Image Plane | ∞ | | | |

ASPHERIC DATA

1st Surface

K = 0.00000e+000 A 4 = 8.22656e−005 A 6 = −5.11686e−007
A 8 = 2.31259e−009 A 10 = −5.57025e−012

2nd Surface

K = 0.00000e+000 A 4 = 3.18137e−005 A 6 = 1.93292e−008
A 8 = −1.36345e−008 A 10 = 1.34414e−010 A 12 = −8.97496e−013

10th Surface

K = 0.00000e+000 A 4 = −6.73529e−005 A 6 = −4.40217e−007
A 8 = 1.25535e−008 A 10 = −3.35437e−010

11th Surface

K = 0.00000e+000 A 4 = 9.50766e−005 A 6 = −3.20616e−007
A 8 = 3.06524e−009 A 10 = −1.45024e−010

-continued

UNIT: mm

18th Surface

K = 0.00000e+000 A 4 = 7.60043e−005 A 6 = −1.62831e−006
A 8 = 1.26575e−007 A 10 = −7.38980e−009 A 12 = 1.65076e−010

VARIOUS DATA
Zoom Ratio 2.95

| | Wide-Angle | Middle | Telephoto |
|---|---|---|---|
| Focal Length: | 6.00 | 9.59 | 17.70 |
| F-Number: | 2.06 | 3.00 | 4.12 |
| Half Angle of View: | 47.20 | 37.85 | 24.03 |
| Image Height: | 6.48 | 7.46 | 7.89 |
| Overall Lens Length: | 66.63 | 61.46 | 65.62 |
| BF | 9.52 | 9.63 | 9.14 |
| d 8 | 20.00 | 9.61 | 2.22 |
| d16 | 2.02 | 4.25 | 7.58 |
| d18 | 3.80 | 6.69 | 15.39 |
| d20 | 6.89 | 7.00 | 6.52 |
| d24 | 1.20 | 1.20 | 1.20 |

Zoom Lens Unit Data

| Lens Unit | Starting Surface | Focal Length: |
|---|---|---|
| 1 | 1 | −10.72 |
| 2 | 9 | 14.19 |
| 3 | 17 | −25.32 |
| 4 | 19 | 34.07 |

NUMERICAL EXAMPLE 5

UNIT: mm

Surface Data

| Surface No. | r | d | nd | vd |
|---|---|---|---|---|
| 1 | 19.713 | 0.80 | 1.88300 | 40.8 |
| 2 | 7.510 | 2.52 | | |
| 3 | 13.871 | 0.70 | 1.55332 | 71.7 |
| 4* | 6.667 | 4.12 | | |
| 5 | −14.591 | 0.50 | 1.49700 | 81.5 |
| 6 | 82.003 | 0.10 | | |
| 7 | 21.488 | 1.70 | 1.85478 | 24.8 |
| 8 | −205.657 | (Variable) | | |
| 9 (Diaphragm) | ∞ | 0.50 | | |
| 10* | 8.533 | 2.67 | 1.62263 | 58.2 |
| 11* | −22.928 | 2.80 | | |
| 12 | −34.596 | 0.40 | 1.91082 | 35.3 |
| 13 | 6.606 | 2.88 | 1.49700 | 81.5 |
| 14 | −19.126 | 0.15 | | |
| 15 | 25.493 | 1.78 | 1.49700 | 81.5 |
| 16 | −13.300 | (Variable) | | |
| 17 | 159.963 | 0.50 | 1.59201 | 67.0 |
| 18* | 13.238 | (Variable) | | |
| 19 | 112.954 | 2.39 | 1.72916 | 54.7 |
| 20 | −26.473 | (Variable) | | |
| 21 | ∞ | 0.59 | 1.51633 | 64.1 |
| 22 | ∞ | 0.71 | | |
| 23 | ∞ | 0.50 | 1.51633 | 64.1 |
| 24 | ∞ | (Variable) | | |
| Image Plane | ∞ | | | |

-continued

UNIT: mm

ASPHERIC DATA

4th Surface

K = 0.00000e+000 A 4 = −3.34711e−004 A 6 = −5.08396e−006
A 8 = −3.51487e−008 A 10 = −9.41045e−009 A 12 = 3.50391e−010
A 14 = −6.25488e−012

10th Surface

K = 0.00000e+000 A 4 = −1.34397e−004 A 6 = −4.85187e−007
A 8 = 7.58034e−009 A 10 = −8.54485e−010

11th Surface

K = 0.00000e+000 A 4 = 1.90300e−004 A 6 = −9.92100e−007
A 8 = 1.91128e−008 A 10 = −7.82406e−010

18th Surface

K = 0.00000e+000 A 4 = 1.53172e−004 A 6 = −2.23324e−006
A 8 = 5.13847e−008 A 10 = −1.10708e−009

VARIOUS DATA
Zoom Ratio 2.95

|  | Wide-Angle | Middle | Telephoto |
| --- | --- | --- | --- |
| Focal Length: | 6.00 | 9.61 | 17.70 |
| F-Number: | 2.88 | 3.55 | 4.63 |
| Half Angle of View: | 47.20 | 37.94 | 24.03 |
| Image Height: | 6.48 | 7.50 | 7.89 |
| Overall Lens Length: | 50.84 | 48.99 | 53.55 |
| BF | 8.34 | 7.50 | 5.16 |
| d 8 | 12.98 | 5.99 | 0.98 |
| d16 | 1.75 | 4.45 | 8.57 |
| d18 | 3.26 | 6.55 | 14.33 |
| d20 | 5.71 | 4.87 | 2.53 |
| d24 | 1.20 | 1.20 | 1.20 |

Zoom Lens Unit Data

| Lens Unit | Starting Surface | Focal Length: |
| --- | --- | --- |
| 1 | 1 | −8.97 |
| 2 | 9 | 12.14 |
| 3 | 17 | −24.41 |
| 4 | 19 | 29.63 |

NUMERICAL EXAMPLE 6

UNIT: mm

Surface Data

| Surface No. | r | d | nd | vd |
| --- | --- | --- | --- | --- |
| 1 | 20.349 | 0.80 | 1.88300 | 40.8 |
| 2 | 7.466 | 2.60 | | |
| 3 | 14.429 | 0.70 | 1.59201 | 67.0 |
| 4* | 7.083 | 3.98 | | |
| 5 | −14.502 | 0.50 | 1.49700 | 81.5 |
| 6 | 103.808 | 0.10 | | |
| 7 | 24.117 | 1.66 | 2.00069 | 25.5 |
| 8 | −220.820 | (Variable) | | |
| 9 (Diaphragm) | ∞ | 0.50 | | |
| 10* | 8.782 | 2.56 | 1.76802 | 49.2 |
| 11* | −29.057 | 1.41 | | |
| 12 | −23.872 | 0.40 | 1.88300 | 40.8 |
| 13 | 6.752 | 2.85 | 1.49700 | 81.5 |
| 14 | −19.076 | 0.15 | | |
| 15 | 16.287 | 0.40 | 1.91082 | 35.3 |
| 16 | 8.035 | 3.33 | 1.49700 | 81.5 |
| 17 | −12.166 | (Variable) | | |
| 18 | 102.415 | 0.40 | 1.59201 | 67.0 |
| 19* | 13.404 | (Variable) | | |
| 20 | 258.282 | 2.16 | 1.72916 | 54.7 |
| 21 | −25.288 | (Variable) | | |
| 22 | ∞ | 0.59 | 1.51633 | 64.1 |
| 23 | ∞ | 0.71 | | |
| 24 | ∞ | 0.50 | 1.51633 | 64.1 |
| 25 | ∞ | (Variable) | | |
| Image Plane | ∞ | | | |

ASPHERIC DATA

4th Surface

K = 0.00000e+000 A 4 = −3.09011e−004 A 6 = −2.63028e−006
A 8 = −2.28712e−007 A 10 = 5.66325e−009 A 12 = −1.13428e−010

10th Surface

K = 0.00000e+000 A 4 = −7.27532e−005 A 6 = −4.31905e−007
A 8 = 3.97968e−008 A 10 = −1.80914e−009

11th Surface

K = 0.00000e+000 A 4 = 1.62323e−004 A 6 = −1.35545e−006
A 8 = 3.64737e−008 A 10 = −1.79186e−009

19th Surface

K = 0.00000e+000 A 4 = 1.60864e−004 A 6 = −2.91579e−006
A 8 = 9.20228e−008 A 10 = −2.14039e−009

VARIOUS DATA
Zoom Ratio 2.95

|  | Wide-Angle | Middle | Telephoto |
| --- | --- | --- | --- |
| Focal Length: | 6.00 | 9.68 | 17.70 |
| F-Number: | 2.88 | 3.55 | 4.63 |
| Half Angle of View: | 47.20 | 37.77 | 24.03 |
| Image Height: | 6.48 | 7.50 | 7.89 |
| Overall Lens Length: | 51.75 | 49.55 | 53.82 |
| BF | 8.80 | 8.01 | 5.57 |
| d 8 | 13.66 | 6.31 | 1.19 |
| d17 | 1.75 | 4.47 | 8.66 |
| d19 | 3.04 | 6.26 | 13.91 |
| d21 | 6.17 | 5.38 | 2.94 |
| d25 | 1.20 | 1.20 | 1.20 |

Zoom Lens Unit Data

| Lens Unit | Starting Surface | Focal Length: |
| --- | --- | --- |
| 1 | 1 | −9.26 |
| 2 | 9 | 12.20 |
| 3 | 18 | −26.10 |
| 4 | 20 | 31.69 |

NUMERICAL EXAMPLE 7

UNIT: mm

Surface Data

| Surface No. | r | d | nd | vd |
| --- | --- | --- | --- | --- |
| 1* | 37.875 | 0.85 | 1.88202 | 37.2 |
| 2* | 5.706 | 5.64 | | |
| 3 | −19.128 | 0.55 | 1.48749 | 70.2 |
| 4 | 17.432 | 2.40 | 2.00330 | 28.3 |
| 5 | −80.496 | (Variable) | | |
| 6 (Diaphragm) | ∞ | 0.30 | | |
| 7* | 5.450 | 2.50 | 1.83441 | 37.3 |
| 8* | 78.786 | 0.86 | | |
| 9 | −55.812 | 0.40 | 2.00330 | 28.3 |
| 10 | 3.799 | 2.99 | 1.59282 | 68.6 |

-continued

UNIT: mm

| | | | | |
|---|---|---|---|---|
| 11 | −9.321 | (Variable) | | |
| 12 | −22.221 | 0.50 | 1.88202 | 37.2 |
| 13* | −140.117 | (Variable) | | |
| 14 | 33.921 | 2.31 | 1.88300 | 40.8 |
| 15 | −60.268 | (Variable) | | |
| 16 | ∞ | 0.59 | 1.51633 | 64.1 |
| 17 | ∞ | 0.71 | | |
| 18 | ∞ | 0.50 | 1.51633 | 64.1 |
| 19 | ∞ | (Variable) | | |
| Image Plane | ∞ | | | |

ASPHERIC DATA

1st Surface

K = 0.00000e+000 A 4 = 3.07170e−005 A 6 = −2.85713e−006
A 8 = 5.02508e−008 A 10 = −3.81457e−010 A 12 = 7.33573e−013

2nd Surface

K = −1.24102e+000 A 4 = 3.96840e−004 A 6 = 8.12447e−006
A 8 = −7.05549e−007 A 10 = 2.23124e−008 A 12 = −2.66763e−010
A 14 = 2.66619e−013

7th Surface

K = 0.00000e+000 A 4 = 8.43915e−005 A 6 = 3.26318e−005
A 8 = −2.01858e−006 A 10 = 2.88916e−007

8th Surface

K = 0.00000e+000 A 4 = 9.51140e−004 A 6 = 5.74619e−005
A 8 = −3.62256e−006 A 10 = 8.31994e−007

13th Surface

K = 0.00000e+000 A 4 = 2.97058e−004 A 6 = −7.83370e−006
A 8 = 4.69427e−007 A 10 = −1.47920e−008

VARIOUS DATA
Zoom Ratio 2.20

| | Wide-Angle | Middle | Telephoto |
|---|---|---|---|
| Focal Length: | 5.63 | 8.78 | 12.38 |
| F-Number: | 2.88 | 4.22 | 5.05 |
| Half Angle of View: | 48.27 | 40.18 | 32.51 |
| Image Height: | 6.31 | 7.42 | 7.89 |
| Overall Lens Length: | 39.63 | 37.80 | 38.55 |
| BF | 4.68 | 4.41 | 4.18 |
| d 5 | 10.02 | 4.13 | 0.83 |
| d11 | 3.16 | 3.72 | 4.82 |
| d13 | 2.47 | 6.24 | 9.41 |
| d15 | 2.46 | 2.18 | 1.96 |
| d19 | 0.80 | 0.80 | 0.80 |

Zoom Lens Unit Data

| Lens Unit | Starting Surface | Focal Length: |
|---|---|---|
| 1 | 1 | −10.35 |
| 2 | 6 | 10.34 |
| 3 | 12 | −30.00 |
| 4 | 14 | 24.87 |

NUMERICAL EXAMPLE 8

UNIT: mm

Surface Data

| Surface No. | r | d | nd | vd |
|---|---|---|---|---|
| 1 | 17.097 | 0.90 | 2.00100 | 29.1 |
| 2 | 8.532 | 2.01 | | |
| 3* | 33.980 | 0.85 | 1.61881 | 63.9 |
| 4* | 10.566 | 4.87 | | |
| 5 | −16.476 | 0.55 | 1.59282 | 68.6 |
| 6 | 62.140 | 0.10 | | |
| 7 | 23.195 | 1.89 | 1.89286 | 20.4 |
| 8 | −226.162 | (Variable) | | |
| 9 (Diaphragm) | ∞ | (Variable) | | |
| 10* | 8.168 | 2.69 | 1.83441 | 37.3 |
| 11* | −30.910 | 0.73 | | |
| 12 | −39.240 | 0.50 | 1.75520 | 27.5 |
| 13 | 23.586 | 0.37 | | |
| 14 | 21.518 | 0.45 | 2.00330 | 28.3 |
| 15 | 5.299 | 4.34 | 1.53775 | 74.7 |
| 16 | −11.873 | (Variable) | | |
| 17 | −37.146 | 0.50 | 1.62263 | 58.2 |
| 18* | 28.833 | (Variable) | | |
| 19 | 119.940 | 2.76 | 1.49700 | 81.5 |
| 20 | −20.643 | (Variable) | | |
| 21* | −84.339 | 1.12 | 1.53160 | 55.8 |
| 22 | −36.553 | (Variable) | | |
| 23 | ∞ | 0.59 | 1.51633 | 64.1 |
| 24 | ∞ | 0.71 | | |
| 25 | ∞ | 0.50 | 1.51633 | 64.1 |
| 26 | ∞ | (Variable) | | |
| Image Plane | ∞ | | | |

ASPHERIC DATA

3rd Surface

K = 0.00000e+000 A 4 = 1.30686e−003 A 6 = −3.66480e−005
A 8 = 8.27749e−007 A 10 = −1.09260e−008 A 12 = 7.38860e−011
A 14 = −1.90474e−013

4th Surface

K = 0.00000e+000 A 4 = 1.38307e−003 A 6 = −2.83353e−005
A 8 = 1.12519e−007 A 10 = 2.11604e−008 A 12 = −5.74648e−010
A 14 = 4.59013e−012

10th Surface

K = 0.00000e+000 A 4 = −6.61407e−005 A 6 = −9.98056e−007
A 8 = 1.80942e−007 A 10 = −1.08070e−008 A 12 = 3.01433e−010

11th Surface

K = 0.00000e+000 A 4 = 2.13642e−004 A 6 = −1.85325e−006
A 8 = 1.94407e−007 A 10 = −1.14860e−008 A 12 = 3.45297e−010

18th Surface

K = 0.00000e+000 A 4 = 1.95983e−004 A 6 = −1.36279e−005
A 8 = 2.57844e−006 A 10 = −2.99184e−007 A 12 = 1.72626e−008
A 14 = −3.88621e−010

21st Surface

K = 0.00000e+000 A 4 = 9.58672e−006 A 6 = −2.78386e−007
A 8 = 5.96411e−010 A 10 = −2.30074e−012

VARIOUS DATA
Zoom Ratio 2.95

| | Wide-Angle | Middle | Telephoto |
|---|---|---|---|
| Focal Length: | 6.00 | 9.60 | 17.70 |
| F-Number: | 2.88 | 3.55 | 4.63 |
| Half Angle of View: | 47.20 | 37.83 | 24.03 |
| Image Height: | 6.48 | 7.46 | 7.89 |
| Overall Lens Length: | 52.46 | 50.47 | 55.63 |
| BF | 7.06 | 7.06 | 7.06 |
| d 8 | 14.37 | 7.35 | 1.98 |
| d 9 | 1.36 | 1.06 | 1.00 |
| d16 | 2.01 | 3.97 | 8.32 |
| d18 | 1.44 | 4.26 | 11.65 |
| d20 | 1.60 | 2.15 | 1.00 |
| d22 | 4.43 | 4.43 | 4.43 |
| d26 | 1.20 | 1.20 | 1.20 |

-continued

UNIT: mm

Zoom Lens Unit Data

| Lens Unit | Starting Surface | Focal Length: |
|---|---|---|
| 1 | 1 | −9.75 |
| 2 | 10 | 11.99 |
| 3 | 17 | −26.00 |
| 4 | 19 | 35.67 |
| 5 | 21 | 120.38 |

NUMERICAL EXAMPLE 9

UNIT: mm

Surface Data

| Surface No. | r | d | nd | vd |
|---|---|---|---|---|
| 1* | 76.185 | 1.20 | 1.75501 | 51.2 |
| 2* | 9.263 | 6.91 | | |
| 3 | −17.670 | 0.75 | 1.49700 | 81.5 |
| 4 | −1924.189 | 0.10 | | |
| 5 | 33.538 | 1.54 | 1.92286 | 18.9 |
| 6 | 168.462 | (Variable) | | |
| 7* | 10.994 | 3.17 | 1.69350 | 53.2 |
| 8* | −237.615 | 1.02 | | |
| 9 (Diaphragm) | ∞ | 1.56 | | |
| 10 | 31.539 | 0.55 | 1.95375 | 32.3 |
| 11 | 7.623 | 4.03 | 1.49700 | 81.5 |
| 12 | −82.016 | 0.10 | | |
| 13 | 24.898 | 2.20 | 1.49700 | 81.5 |
| 14 | −24.594 | (Variable) | | |
| 15 | 92.580 | 0.50 | 1.61881 | 63.9 |
| 16* | 11.725 | (Variable) | | |
| 17 | 36.695 | 3.13 | 1.69680 | 55.5 |
| 18 | −22.404 | (Variable) | | |
| 19 | −62.805 | 0.80 | 1.75500 | 52.3 |
| 20 | 64.121 | (Variable) | | |
| 21 | ∞ | 0.59 | 1.51633 | 64.1 |
| 22 | ∞ | 0.71 | | |
| 23 | ∞ | 0.50 | 1.51633 | 64.1 |
| 24 | ∞ | (Variable) | | |
| Image Plane | ∞ | | | |

-continued

UNIT: mm

ASPHERIC DATA

1st Surface

K = 0.00000e+000 A 4 = 3.82471e−005 A 6 = −2.56926e−008
A 8 = 7.70515e−010 A 10 = −1.19234e−011 A 12 = 4.41561e−014

2nd Surface

K = 0.00000e+000 A 4 = −2.87142e−005 A 6 = 8.39916e−008
A 8 = −1.68491e−008 A 10 = 4.42451e−010 A 12 = −4.88987e−012

7th Surface

K = 0.00000e+000 A 4 = −5.20430e−005 A 6 = −8.68508e−008
A 8 = −1.21062e−010 A 10 = −3.51842e−011

8th Surface

K = 0.00000e+000 A 4 = 6.36395e−005 A 6 = −4.62700e−008
A 8 = −2.98057e−009 A 10 = 2.12547e−011

16th Surface

K = 0.00000e+000 A 4 = 8.85292e−005 A 6 = 1.09150e−006
A 8 = −4.00734e−007 A 10 = 3.66866e−008 A 12 = −1.17006e−009

VARIOUS DATA
Zoom Ratio 3.66

| | Wide-Angle | Middle | Telephoto |
|---|---|---|---|
| Focal Length: | 6.76 | 11.73 | 24.77 |
| F-Number: | 2.88 | 3.50 | 4.12 |
| Half Angle of View: | 43.79 | 32.45 | 17.67 |
| Image Height: | 6.48 | 7.46 | 7.89 |
| Overall Lens Length: | 63.63 | 57.50 | 61.95 |
| BF | 3.76 | 5.31 | 8.17 |
| d 6 | 22.20 | 10.36 | 2.00 |
| d14 | 1.70 | 5.16 | 11.47 |
| d16 | 3.51 | 5.77 | 12.26 |
| d18 | 4.91 | 3.36 | 0.50 |
| d20 | 1.13 | 2.68 | 5.55 |
| d24 | 1.20 | 1.20 | 1.20 |

Zoom Lens Unit Data

| Lens Unit | Starting Surface | Focal Length: |
|---|---|---|
| 1 | 1 | −12.74 |
| 2 | 7 | 14.27 |
| 3 | 15 | −21.75 |
| 4 | 17 | 20.41 |
| 5 | 19 | −41.91 |

TABLE 1 shows various values corresponding to the respective numerical examples.

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| fw | 6.000 | 6.000 | 6.000 | 6.000 | 6.000 | 6.000 | 5.630 | 6.000 | 6.760 |
| ft | 12.380 | 37.700 | 12.573 | 17.700 | 17.700 | 17.700 | 12.380 | 17.700 | 24.770 |
| Fno | 2.884 | 2.884 | 2.060 | 2.060 | 2.884 | 2.884 | 2.884 | 2.884 | 2.884 |
| f1 | −9.258 | −9.637 | −10.061 | −10.722 | −8.968 | −9.262 | −10.346 | −9.753 | −12.740 |
| f2 | 9.480 | 12.280 | 12.958 | 14.192 | 12.139 | 12.203 | 10.337 | 11.992 | 14.272 |
| r1 | 5.270 | 8.427 | 6.566 | 9.361 | 6.667 | 7.083 | 5.705 | 10.566 | 9.263 |
| r2 | −13.042 | −16.371 | −19.525 | −17.261 | −14.591 | −14.502 | −19.128 | −16.476 | −17.670 |
| D1 | 8.717 | 10.992 | 10.439 | 15.734 | 10.439 | 10.341 | 9.437 | 11.163 | 10.493 |
| D2 | 6.481 | 8.908 | 13.662 | 12.600 | 10.675 | 11.098 | 6.753 | 9.075 | 12.625 |
| D3 | 0.500 | 0.500 | 0.500 | 0.550 | 0.500 | 0.400 | 0.500 | 0.500 | 0.500 |
| D4 | 2.708 | 1.900 | 2.929 | 1.900 | 2.385 | 2.161 | 2.310 | 2.762 | 3.125 |
| D5 | | | | | | | | 1.122 | 0.800 |
| Dsum | 18.400 | 22.300 | 27.500 | 30.784 | 24.000 | 24.000 | 19.000 | 24.622 | 27.543 |
| Lw | 32.128 | 43.057 | 47.434 | 57.106 | 42.496 | 42.951 | 34.945 | 45.403 | 59.865 |
| β4w | 0.785 | 0.715 | 0.695 | 0.720 | 0.710 | 0.719 | 0.780 | 0.719 | 0.535 |
| β4t | 0.814 | 0.749 | 0.724 | 0.731 | 0.817 | 0.821 | 0.800 | 0.736 | 0.586 |
| M2 | −7.397 | −15.292 | −8.843 | −16.673 | −14.711 | −14.551 | −8.107 | −15.920 | −18.523 |
| M4 | 0.696 | 1.175 | 0.674 | 0.379 | 3.180 | 3.233 | 0.500 | 0.598 | 0.000 |
| ωt(°) | 32.51 | 24.03 | 32.11 | 24.03 | 24.03 | 24.03 | 32.51 | 24.03 | 17.67 |
| BFt | 3.63 | 8.91 | 5.76 | 9.14 | 5.16 | 5.57 | 4.18 | 7.06 | 8.17 |

-continued

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Conditional expression | (1) | f1/D1 | −1.062 | −0.877 | −0.967 | −0.681 | −0.859 | −0.896 | −1.096 | −0.874 | −1.214 |
|  | (2) | nLnave | 2.003 | 2.003 | 1.904 | 1.881 | 1.911 | 1.897 | 2.003 | 1.879 | 1.954 |
|  | (3) | (r2 + r1)/(r2 − r1) | 0.424 | 0.320 | 0.497 | 0.297 | 0.373 | 0.344 | 0.540 | 0.219 | 0.312 |
|  | (4) | vd | 64.140 | 68.630 | 81.540 | 81.560 | 81.540 | 81.540 | 70.230 | 68.630 | 81.540 |
|  | (5) | (Dsum/Lw) * Fno | 1.652 | 1.494 | 1.194 | 1.111 | 1.629 | 1.612 | 1.568 | 1.564 | 1.327 |
|  | (6) | β4t/β4w | 1.036 | 1.048 | 1.041 | 1.015 | 1.151 | 1.142 | 1.026 | 1.023 | 1.097 |
|  | (7) | M4/Lw | 0.022 | 0.027 | 0.014 | 0.007 | 0.075 | 0.075 | 0.014 | 0.013 | 0.000 |
|  | (8) | fw/D1 | 0.688 | 0.546 | 0.576 | 0.381 | 0.575 | 0.580 | 0.597 | 0.537 | 0.644 |
|  | (9) | f2/fw | −1.543 | −1.606 | −1.677 | −1.787 | −1.495 | −1.544 | −1.838 | −1.626 | −1.885 |
|  | (10) | f1/f2 | −0.977 | −0.785 | −0.776 | −0.756 | −0.739 | −0.759 | −1.001 | −0.813 | −0.893 |
|  | (11) | M2/Lw | −0.230 | −0.355 | −0.186 | −0.294 | −0.346 | −0.339 | −0.232 | −0.351 | −0.309 |
|  | (12) | BFt/(ft × tanωt) | 0.460 | 1.129 | 0.730 | 1.158 | 0.634 | 0.706 | 0.530 | 0.895 | 1.035 |

Image Pickup Apparatus

Figure 19:
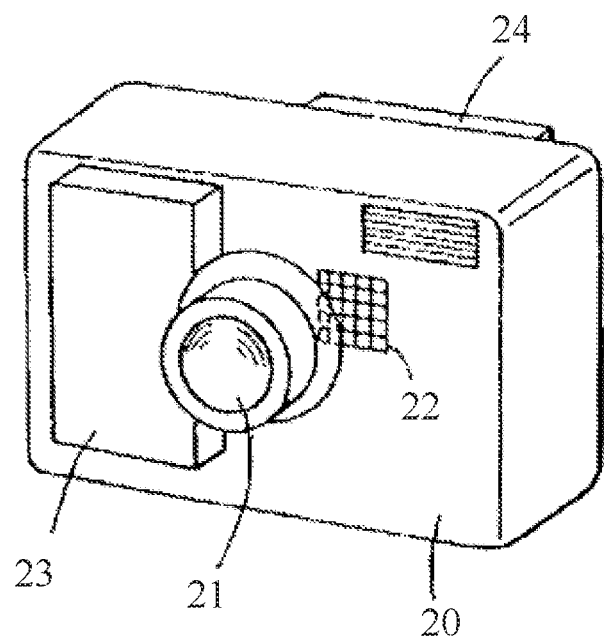
FIG. 19 is a schematic view of an image pickup apparatus according to each example.

Referring now to FIG. 19, a description will be given of a digital still camera (image pickup apparatus) using the zoom lens according to each example for an imaging optical system. FIG. 19 is a schematic view of the image pickup apparatus.

In FIG. 19, reference numeral 20 denotes a camera body, and reference numeral 21 denotes an imaging optical system including the zoom lens according to any one of Examples 1 to 9. Reference numeral 22 denotes an image sensor (photoelectric conversion element) such as a CCD sensor or a CMOS sensor, which is built in the camera body and receives an optical image formed by the imaging optical system 21 and performs the photoelectric conversion. Reference numeral 23 denotes a memory that records information corresponding to the object image photoelectrically converted by the image sensor 22. Reference numeral 24 denotes a viewfinder including a liquid crystal display panel or the like for observing the object image formed on the image sensor 22. The camera body 20 may be a so-called single-lens reflex camera having a quick turn mirror, or a so-called mirrorless camera having no quick turn mirror.

Each example can provide a wide-angle, high-performance, and compact zoom lens, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-084955, filed on May 14, 2020 which is hereby incorporated by reference herein in its entirety.

What is claimed is:

1. A zoom lens comprising, in order from an object side to an image side, a first lens unit having a negative refractive power, a second lens unit having a positive refractive power, a third lens unit having a negative refractive power, and a fourth lens unit having a positive refractive power,
wherein the first lens unit includes a negative lens B1Ln with a concave surface facing the object side,
wherein the second lens unit includes at least one negative lens,
wherein during zooming from a wide-angle end to a telephoto end, the first lens unit moves, and the fourth lens unit is fixed or moves from the object side to the image side, and wherein the following inequalities are satisfied:

$-1.50 < f1/D1 < -0.859$ $1.870 < nLnave < 2.500$ $60.00 < vd < 100.00$ where f1 is a focal length of the first lens unit, D1 is a distance on an optical axis from a surface closest to an object to a surface closest to an image plane of the first lens unit, nLnave is an average refractive index of all negative lenses included in the second lens unit, and vd is an Abbe number of the negative lens B1Ln for d-line.

2. The zoom lens according to claim 1, wherein the first lens unit includes an air lens adjacent to the object side of the negative lens B1Ln, and the following inequality is satisfied:

$0.10 < (r2+r1)/(r2-r1) < 0.80$ where r1 is a radius of curvature of a surface R1 on the object side of the air lens, and r2 is a radius of curvature of a surface R2 on the image side of the air lens.

3. The zoom lens according to claim 1, wherein the second lens unit includes at least one cemented lens consisting of a negative lens and a positive lens.

4. The zoom lens according to claim 1, wherein during focusing from infinity to a close distance, at least part of the third lens unit moves from the object side to the image side.

5. The zoom lens according to claim 1, wherein the first lens unit includes, in order from the object side to the image side, a negative lens, a negative lens, and a positive lens.

6. The zoom lens according to claim 1, wherein the following inequality is satisfied:

$0.80 < (Dsum/Lw) \times Fno < 1.80$ where Dsum is a sum of distances on the optical axis from a surface closest to the object to a surface closest to the image plane for each lens unit in the zoom lens, Lw is a distance on the optical axis from a surface closest to the object of the first lens unit to a surface closest to the image plane of a lens unit closest to the image plane of the zoom lens at the wide-angle end, and Fno is an F-number at the wide-angle end.

7. The zoom lens according to claim 1, wherein the following inequality is satisfied:

$1.00 \leq \beta4t/\beta4w < 1.40$ where β4w is a lateral magnification at the wide-angle end of the fourth lens unit, and β4t is a lateral magnification of the fourth lens unit at the telephoto end.

8. The zoom lens according to claim 1, wherein the following inequality is satisfied:

$0.00 \leq M4/Lw \leq 0.15$ where Lw is a distance on the optical axis from a surface closest to the object of the first lens unit to a surface closest to the image plane of a lens unit closest to the image plane of the zoom lens at the wide-angle end, and M4 is a moving amount from the wide-angle end to the telephoto end of the fourth lens unit, and a sign of the moving amount M4 is positive in a moving direction from the object side to the image side.

9. The zoom lens according to claim 1, wherein the following inequality is satisfied:

$$0.20 < fw/D1 < 0.90$$

where fw is a focal length of the zoom lens at the wide-angle end.

10. The zoom lens according to claim 1, wherein the following inequality is satisfied:

$$-2.40 < f1/fw < -1.20$$

where f2 is a focal length of the zoom lens at the wide-angle end.

11. The zoom lens according to claim 1, wherein the following inequality is satisfied:

$$-1.30 < f1/f2 < -0.50$$

where f2 is a focal length of the second lens unit.

12. The zoom lens according to claim 1, wherein the following inequality is satisfied:

$$-0.55 < M2/Lw < -0.10$$

where Lw is a distance on the optical axis from a surface closest to the object of the first lens unit to a surface closest to the image plane of a lens unit closest to the image plane of the zoom lens at the wide-angle end, M2 is a moving amount from the wide-angle end to the telephoto end of the second lens unit, and a sign of the moving amount M2 is positive in a moving direction from the object side to the image side.

13. The zoom lens according to claim 1, wherein the first lens unit, the second lens unit, and the third lens unit each include at least one aspherical lens.

14. The zoom lens according to claim 1, wherein the following inequality is satisfied:

$$0.20 < BFt/(ft \times \tan \omega t) < 1.40$$

where ft, $\omega t$, and BFt are a focal length, a half angle of view, and an air equivalent backfocus at a telephoto end, respectively.

15. An image pickup apparatus comprising:
a zoom lens; and
an image sensor configured to receive an image formed by the zoom lens,
wherein the zoom lens includes, in order from an object side to an image side, a first lens unit having a negative refractive power, a second lens unit having a positive refractive power, a third lens unit having a negative refractive power, and a fourth lens unit having a positive refractive power,
wherein the first lens unit includes a negative lens B1Ln with a concave surface facing the object side,
wherein the second lens unit includes at least one negative lens,
wherein during zooming from a wide-angle end to a telephoto end, the first lens unit moves, and the fourth lens unit is fixed or moves from the object side to the image side, and wherein the following inequalities are satisfied:

$$-1.50 < f1/D1 < -0.859$$

$$1.870 < nLnave < 2.500$$

$$60.00 < vd < 100.00$$

where f1 is a focal length of the first lens unit, D1 is a distance on an optical axis from a surface closest to an object to a surface closest to an image plane of the first lens unit, nLnave is an average refractive index of all negative lenses included in the second lens unit, and vd is an Abbe number of the negative lens B1Ln for d-line.

* * * * *